United States Patent [19]
Resch

[11] Patent Number: 4,836,617
[45] Date of Patent: Jun. 6, 1989

[54] ANTILOCKING SYSTEM (ABS) AND PROPULSION CONTROL SYSTEM (ASR) FOR A ROAD VEHICLE

[75] Inventor: Reinhard Resch, Stuttgart, Fed. Rep. of Germany

[73] Assignee: Daimler-Benz Aktiengesellschaft, Stuttgart, Fed. Rep. of Germany

[21] Appl. No.: 227,106

[22] Filed: Aug. 1, 1988

[30] Foreign Application Priority Data

Aug. 1, 1987 [DE] Fed. Rep. of Germany ....... 3725594

[51] Int. Cl.⁴ ............................................... B60T 8/44
[52] U.S. Cl. ................................... 303/100; 180/197; 303/92; 303/110; 303/114
[58] Field of Search ................. 180/197; 303/92, 100, 303/102, 103, 106, 110, 111, 114

[56] References Cited

U.S. PATENT DOCUMENTS

| | | | |
|---|---|---|---|
| 4,741,581 | 5/1988 | Krohn | 180/197 X |
| 4,755,008 | 7/1988 | Imoto et al. | 303/110 |
| 4,778,224 | 10/1988 | Leiber | 303/114 |
| 4,783,128 | 11/1988 | Resch | 303/114 |

Primary Examiner—Duane A. Reger
Attorney, Agent, or Firm—Barnes & Thornburg

[57] ABSTRACT

In an antilocking ABS and propulsion ASR control system for a road vehicle, there is a brake pressure regulating member used for both antilocking ABS and for propulsion ASR control in which a hydraulic cylinder having a piston driven under valve controls defines an ABS control space, increasing when a drive pressure space of the cylinder is subjected to pressure, and an ASR outlet pressure space, decreasing when the drive pressure space of the hydraulic cylinder is subjected to pressure; and wherein, in normal braking, not subjected to ABS or ASR control, both spaces are connected to the brake circuit of the driven vehicle wheels. The control system is activated as a result of the valve control connection of an auxiliary pressure source to the drive pressure space of the hydraulic cylinder. The control mode is selected by means of a function control valve arrangement which, in the event of antilocking ABS control, connects the main brake line with only the ABS control space and, in the event of propulsion ASR control connects the main brake line with only the ASR outlet pressure space.

28 Claims, 12 Drawing Sheets

ANTILOCKING SYSTEM (ABS) AND PROPULSION CONTROL SYSTEM (ASR) FOR A ROAD VEHICLE

BACKGROUND AND SUMMARY OF THE INVENTION

Antilocking system (ABS) and propulsion control system (ASR) for a road vehicle.

The invention relates to an antilocking system (ABS) and a propulsion control system (ASR) for a road vehicle with a hydraulic multi-circuit brake system, in which the brakes of the driven vehicle wheels form a static brake circuit connected to an outlet pressure space of a brake unit actuable by a pedal. The ABS antilocking system works on the principle of controlling brake pressure reduction and brake pressure build-up phases of the antilocking control by respectively increasing and decreasing the volume of an ABS control space connected to the wheel brakes. The propulsion ASR control works on the principle of decelerating a vehicle wheel tending to spin by activating its wheel brake until its drive slip remains within a range of values compatible both with good propulsion acceleration and good driving stability.

The invention provides for an activatable brake pressure regulating valve for controlling pressure reduction, pressure build-up and pressure holding phases of both the antilocking ABS control and the propulsion ASR control, which is movable out of a through flow position relating to the pressure reduction and pressure build-up phases of the antilocking ABS control and to normal braking not subjected to antilocking control, into a blocking position, related to brake pressure holding phases on the respective wheel brake.

A hydraulic cylinder with a displaceable piston is used for a pressure build-up and pressure reduction regulating of the antilocking ABS control A drive pressure space alternatively connectable by the activatable brake pressure regulating valve to an outlet Pressure of an auxiliary pressure source and to a pressureless tank is used to move the piston. The piston valve is displaceable between end positions by pressure in the drive pressure space to define with the hydraulic cylinder, minimum and maximum volumes of an ABS control space which, during normal braking and in pressure reduction and pressure build-up phases of the antilocking ABS control, is connected by the activatable brake pressure regulating valve with at least one of the wheel brake or brakes of the static brake circuit.

The hydraulic cylinder has an ASR outlet pressure space as a pressure build-up and pressure reduction regulating means of the propulsion ASR control and which is connectable by the activatable brake pressure regulating valve to the outlet pressure space of the brake unit and to the brake circuit of the driven vehicle wheels. The ASR outlet space has a variable area defined by the hydraulic cylinder and piston displaceable in the direction of a brake pressure build-up when the drive pressure space is connected to the outlet pressure of the auxiliary pressure source and to a pressure reduction when the drive pressure space is connected to a non-pressure source.

ABS and ASR function control valves are provided, which in sequence, connect the drive pressure space with the non-pressure source and with the pressure outlet of the auxiliary pressure source for providing pressure reduction and pressure build-up at the wheel brakes for respective control phases of the antilocking ABS and propulsion ASR control.

Such a combination of an antilocking system and of a propulsion control system is the subject of the applicant's own older patent application P 37 06 662.5 not previously published.

In the subject of this older patent application, each wheel brake, which can be subjected to the antilocking control, has assigned to it a hydraulic cylinder which acts as a buffer accumulator. The accumulator space is connected to the wheel brake and at the same time forms a portion of the brake line branch leading to the particular wheel brake. The space is defined in a pressure-type manner by the cylinder piston forming a control pressure space which, under valve control, can be connected to the high-pressure outlet of an auxiliary pressure source or alternatively to its pressureless tank or can be shut off from both. Inserted between the brake pressure outlet, assigned to the respective brake circuit, of the brake unit and the accumulator space of the hydraulic cylinder assigned to the respective wheel brake is an electrically activatable pressure inlet control valve, the basic position of which is the open position. In the open position, brake pressure can be fed into the connected wheel brake, in normal braking, that is to say braking not subject to an antilocking control, as a result of actuation of the brake unit or, as with activation of the propulsion ASR control on a driven vehicle wheel, as a result of valve controlled connection of the pressure outlet of an auxiliary pressure source to the brake circuit of the driven vehicle wheels During starting of the vehicle, and/or after the end of a braking operation, and/or at regular time intervals during motoring, the control pressure spaces of the buffer accumulators are connected briefly, via function control valves assigned individually to the hydraulic cylinders, to the pressure outlet of the auxiliary pressure source provided for propulsion ASR control, after which the function control valves are once again switched back from this excited connecting position into their basic position, namely a blocking position.

As a result, as long as the antilocking ABS control does not respond, the pistons of the hydraulic cylinders are maintained in their end positions linked to a minimum volume of the accumulator spaces and are locked hydraulically in these end positions. To obtain a pressure reduction phase on a wheel brake subjected to the antilocking ABS control, pressure inlet control valves are moved into a blocking position and the control pressure space of the buffer accumulator assigned to the appropriate wheel brake is connected to the pressureless tank of the auxiliary pressure source by changing over its function control valve to its pressure reduction position. This results in the piston of the buffer accumulator moving with the effect of increasing the accumulator space connected to the wheel brake and the desired pressure drop is thus obtained due to the increased space. By switching the function control valve back into its basic neutral blocking position, the brake pressure can subsequently be maintained at a lowered value appropriate for control purposes. A brake pressure rebuild up phase of the antilocking ABS control, necessary at a later stage, can be obtained if the control pressure space of the hydraulic cylinder is Connected to the high-pressure outlet of the auxiliary pressure source by Changing over the associated function control valve to its pressure build-up position. This results in the piston of the hydraulic cylinder again experiencing a displacement with the effect of decreasing the volume of its accumulator space and the brake fluid previously discharged into this accumulate space is forced back into the wheel brake once more. This requires that the outlet pressure level of the auxiliary pressure source is higher than the highest possible brake pressure which can be built up in the wheel brakes as a result of the actuation of the brake unit.

Within the framework of the propulsion ASR control device, connected to the brake circuit of the driven vehicle wheels is a further hydraulic cylinder which acts as a pressure reducer. An ASR function control valve connects this cylinder to the high-pressure outlet of the auxiliary pressure source or its tank, or is shut off from both. As a result, brake pressure build-up, brake pressure reduction and brake pressure holding phases of the propulsion ASR control can be selected, the latter also as a result of the alternate or joint shut off of the inlet control valves used both for the antilocking ABS and for the propulsion ASR control.

The brake unit is shut off from the brake circuits of the vehicle for the duration of a propulsion ASR control cycle.

Regardless of favorable properties of the control devices according to the older patent application P 37 06 662.5, which are to be seen especially in that, during normal braking, the pistons of the hydraulic cylinders provided for the antilocking control and for the propulsion control do not have to be displaced, and therefore their position seals cause no frictional losses, although this would be a disadvantage if, in the event of a failure of the brake booster, braking had to be carried out by pedal force alone. This control system combination is also afflicted with some disadvantages:

Since, when the antilocking control responds, the buffer accumulator of the wheel brake subjected to the control is shut off from the brake unit as a result of the closing of the pressure inlet control valve, the driver obtains a reaction, detectable on the brake pedal, to the response of the ABS antilocking control only when the control has responded on all the wheel brakes combined in the brake circuit, and even then only in the form of an arresting of the brake pedal. However, this brake pedal reaction is unfavorable in as much as it can be misunderstood by the driver. For example, the driver may take this to mean that the brake system has failed completely, which in many cases will lead to a panic reaction from the driver.

Even if restoring springs, which force the buffer accumulator pistons into their basic positions linked to a minimum volume of the accumulator spaces, are made weak, problems occur. Even if the minimum pre-stress and the maximum pre-stress of these springs are equivalent to a pressure of only a few bars, this still has the unfavorable consequence, when the antilocking ABS control responds at low absolute values of the brake pressure, in that the residual pressure which is caused by the pre-stress of the restoring springs and below which the brake pressure cannot be lowered by a pressure reduction phase of the antilocking control, corresponds to a still appreciable proportion of the brake pressure, previously fed into the wheel brakes Therefore, under unfavorable circumstances, the control does not result in a sufficient lowering of the brake pressure.

In addition, the construction of the combined antilocking ABS and propulsion ASR control system according to the older patent application also involves a considerable technical outlay. Although the two buffer accumulators of the dual brake circuit are combined in constructional terms to form a compact constructional unit, nevertheless integration of the pressure converter required for the propulsion control into this hydraulic unit, owing to the necessary insertion of the inlet control valves between the pressure converter and the buffer accumulators, is scarcely feasible in technical terms because it involves an extremely high outlay in terms of construction.

It is true that, in relation to a vehicle with all-wheel drive, German Offenlegungsschrift No. 3 531 137 makes known a combined antilocking ABS and propulsion ASR control system which does not have the disadvantages mentioned above as regards the response of the antilocking ABS control at low brake pressures and no, or at least unclear, notification of the response of the antilocking ABS control. In this combined antilocking ABS and propulsion ASR control system, there are pressure modulators which are assigned individually to the wheel brakes. Each performs the function of a single circuit master cylinder for the drive which there is a double acting hydraulic cylinder having, in addition to a drive pressure space into which the outlet pressure of the pedal actuable brake circuit is fed during normal braking, but also a counter pressure space. As a result of a valve controlled connection of the counter pressure space to an auxiliary pressure source, the piston of the pressure modulator is displaceable, counter to the effect of the drive pressure in the direction of a pressure reduction in the outlet pressure space of the modulator connected to the particular wheel brake. Propulsion ASR control phases can be controlled by coupling the auxiliary pressure source to the drive pressure space of the pressure modulator and shutting off the latter from the outlet pressure space of the brake unit of the brake system.

However, the known antilocking ABS and propulsion ASR control system therein, as compared with the subject of the older patent application, is afflicted with a series of major disadvantages:

Because of the large number of axially successive functional spaces of the pressure modulators, a very large constructional length is required.

The multiplicity of piston seals necessary for sealing off the various functional spaces from one another causes high frictional losses, the result of which can be that, in the event of a failure of the brake booster, the brake system required disproportionately high actuating forces, so that even this malfunction can deceive the driver into thinking that the entire brake system has failed. Because of the numerous piston seals of the pressure modulators, the pistons of which are displaced even during normal braking, the susceptibility to wear of the brake system as a whole is also increased.

Starting from a propulsion control device, combined with an antilocking ABS system of the type mentioned in the introduction, the object of this invention is to improve such a control system in such a way that, while ensuring a simple design and a low susceptibility to faults of the control system, a more sensitive response of the antilocking ABS control at low brake pressures and a reliable notification of the response of the antilocking ABS control are achieved. Also, a space saving constructional integration of the hydraulic antilocking ABS and propulsion ASR control regulating elements becomes possible in a simple way.

The invention provides that a hydraulic cylinder and piston include at least one hydraulic step cylinder with a regulating piston having two piston flanges of differing diameters. One piston flange cooperates with the step cylinder to define the ASR outlet pressure space, and the other piston flange cooperates with the step cylinder to define the ABS control space.

A movable drive piston moves the regulating piston to decease in volume the ASR outlet pressure space and build up the brake pressure in at least one wheel brake, or alternatively, to increase in volume the ABS control space and reduce the brake pressure in at least one wheel brake. The regulating piston is coupled via a piston rod passing displaceably in a pressure tight manner through an intermediate wall of the cylinder housing to the drive piston. The drive piston with the hydraulic cylinder movably defines the drive pressure space which is connected to output pressure of an auxiliary pressure source to build up the pressure therein and to a non-pressure source to relieve the pressure therein.

The drive piston is responsive to increased pressure in the drive Pressure space to move the regulating piston in a direction to increase the ABS control space and decrease the ASR outlet-pressure space and, in response to the release of pressure in the drive pressure space, to move the regulating piston in a direction to decrease the ABS control space and increase the ASR outlet-pressure space. The drive piston is biased by a restoring spring into its basic position corresponding to the minimum volume of the ABS control space.

Accordingly, a brake circuit subjected both to the propulsion ASR control and to the antilocking ABS control utilizes at least one hydraulic cylinder designed as a step cylinder and having a working piston with two piston flanges of differing diameters. One piston flange forms the movable wall of an ASR outlet pressure space, as a result of the decrease in volume of which, brake pressure can be built up in the connected wheel brakes. The other piston flange forms a movable wall of an ABS control space, as a result of the increase in volume of which, brake pressure can be reduced in the connected wheel brakes. This working piston is coupled in terms of movement, via a piston rod passing displaceably in a pressure tight manner through an intermediate wall of the cylinder housing, to a drive piston movably defining a wall of the drive pressure space. As result of valve controlled pressure subjection and relief, the drive piston and the coupled working piston are displaceable, respectively, in the direction of an increase of the ABS control space and a decrease of the ASR outlet pressure space, or a decrease of the ABS control space and an increase of the ASR outlet pressure space. The composite piston structure comprising the working piston and the drive piston is biased by a restoring spring into its basic position corresponding to a minimum volume of the ABS control space and maximum volume of the ASR outlet pressure space. There is a control valve arrangement which performs the following functions:

(a) in normal braking, i.e., braking not subject to the antilocking ABS control, both the outlet pressure space of the brake unit and the ASR outlet pressure space and ABS control space are connected to the wheel brakes;

(b) in braking subjected to the antilocking ABS control, only the ABS control space is connected to the brake line (or brake lines) of the controllable brake circuit, and the ASR outlet pressure space is connected to the outlet pressure space of the brake unit;

(c) when the propulsion ASR control responds, the outlet pressure space of the brake unit is shut off from the wheel brakes, the ABS control space is connected to the pressureless brake fluid storage tank of the brake system, and the ASR outlet pressure space is connected to the brake line or lines leading to the wheel brakes.

The antilocking and propulsion control system according to the invention has at least the following advantages:

Since the composite piston structure of a hydraulic cylinder is displaced in the same direction both when the antilocking control responds and when the propulsion control responds, the drive control of this hydraulic cylinder becomes particularly simple. The constructional design of the hydraulic cylinder provided for controlling the antilocking ABS and propulsion ASR control functions likewise becomes correspondingly simple, since it requires only a single drive pressure space. Since the brake pressure reduction and brake pressure build-up phases of the respective control, which initiate an antilocking ABS or propulsion ASR controlled cycle are controlled by subjecting the drive pressure space of the hydraulic cylinder pressure to a pressure space, a rapid response of the particular control is also guaranteed under all circumstances, with the obvious precondition that the hydraulic drive circuit of the hydraulic cylinder be made sufficiently powerful.

By having the drive pressure space is defined by an intermediate wall and by the drive piston in the hydraulic cylinder, the ASR outlet pressure space is defined by the larger piston step of the regulating piston and the intermediate wall.

While the ABS control space is defined by the smaller piston step of the regulating piston and an end wall of the cylinder housing, the ASR outlet pressure space can thus utilize the smaller diameter piston flange, wherein the ABS control space is defined by the larger diameter piston flange. A piston rod couples the drive piston with the regulating piston and passes through a central bore in the intermediate wall, while the drive pressure space is defined by another end wall of the cylinder housing and the drive piston.

This hydraulic cylinder-piston defining system for the ABS and ASR control spaces, as well as the drive pressure space, has the advantage that the spaces defining relative to the housing by the fixed intermediate wall, and the movable drive piston can be utilized for separating the conventionally different pressure mediums of the drive circuit and the control circuit connected hydraulically to the wheel brakes. This is most beneficial in allowing for a short design of the hydraulic cylinder.

By having the drive piston and the regulating piston as separate piston elements, with the regulating piston supported axially on the drive piston by a rod-shaped extension of the piston guided displaceably in a pressure tight manner through a central bore in the intermediate wall of the cylinder housing and with a restoring spring engaging the regulating piston for biasing the regulating piston and the drive piston into a basic position has the advantage in terms of production, that the housing bore receiving the drive piston and those bore steps of the hydraulic cylinder housing, in which the piston flanges of the working piston are guided displaceably in a pressure tight manner, do not have to be centered exactly. This would be necessary if the drive piston were made in one piece with the working piston.

By having the effective amount of a flange surface of the larger flange of the regulating piston defining the ABS control space, and an effective area of flange surface of the smaller flange of the regulating piston, defining the ASR outlet pressure space approximately of equal size within a range of variation of ±−15%, ensures that, in control phases the antilocking control, the quantity of brake fluid conveyed back into the outlet pressure space of the brake unit corresponds approximately to that which flows back into the ABS control space from the wheel brakes. This prevents the possibility that the outlet pressure space of the brake unit will be controlled empty and ensures that the driver receives an appropriate notification of the activation of the antilocking control.

In the non-activated state of the control system, the ASR and ABS function control valves provide a hydraulic series connection between the outlet pressure space of the brake unit, the ASR outlet pressure space of the hydraulic cylinder, the ABS control space and at least one brake line leading on to the wheel brakes, and which is actuable mechanically by displacement of the regulating piston of the hydraulic cylinder.

This allows the mechanically actuable control valve to open a central valve located in the regulating piston of the hydraulic cylinder, where the central valve can be maintained in its open position non-activated state of the control system, until the regulating piston has been displaced a small initial portion of its functional stroke, whereupon the central valve assumes its closed position, and wherein there is a control valve which, when the respective control (ABS or ASR) is initiated, is changed from a through flow position providing the series connection between the ASR outlet pressure space and the ABS control space to a position blocking the connection between the ASR outlet pressure space and the ABS control space, a simple circuit is provided.

This constructively particularly simple location of the central valve also provides economies.

It goes without saying that, instead of a central valve integrated in the piston of the hydraulic cylinder, it would also be possible to provide a laterally arranged valve which is accommodated in the housing of the hydraulic cylinder and designed as a seat valve. Here the valve body would be biased by a valve spring into the blocking position of the valve and maintained in its open position by a stop arm interacting with the piston of the hydraulic cylinder, in the basic position of the hydraulic cylinder piston. As a result of such a lateral arrangement of a mechanically actuable valve, constructional length can be saved once again.

The above noted control valve arrangement provided within the antilocking and propulsion control provides various design alternatives which can be produced by simple electrically and/or mechanically and-/or hydraulically activated directional valves.

One alternative would have the function control valve comprise a control valve which can be moved out of a basic position, which is assigned to normal braking and to the antilocking ABS control mode in which it connects the outlet pressure space of the brake unit to the ASR outlet pressure space of the hydraulic cylinder, into an excited through flow position, in which the ASR outlet pressure space of the hydraulic cylinder is connected to at least one wheel brake via the brake pressure regulating valve or regulating valves 87 and the outlet pressure space of the brake unit shut off from the ASR outlet pressure space. There, a second function control valve would be movable from a basic position, which corresponds to normal braking and to the antilocking control mode and in which the ABS control space is connected to the wheel brakes of the brake circuit, via a brake pressure regulating valve, to an excited position provided for the ASR control mode and in which the ABS control space is connected with a brake fluid storage tank of the brake system and shut off from the brake circuit. Here, these two function control valves would be 3/2-way solenoid valves receiving output signals from an electronic control unit of the control system for movement into the basic or excited positions necessary for the particular control mode.

Alternatively, one could have the pedal operate on a brake piston to produce a brake pressure in the outlet pressure space with the function control valve comprising two mechanically displaceable controlled valves which, after a small fraction of a brake pressure build-up stroke of the brake piston which reduces the outlet pressure space of the brake unit be moved out of their basic positions into their excited functional positions. Here, one of these two valves would be designed as a 2/2-way valve which in its basic position blocks a flow path leading from the outlet of the ASR outlet pressure space of the hydraulic cylinder to the outlet pressure space of the brake unit and in its excited position opens the flow path. The other of the two mechanically displaceable controlled valves would be designed as 3/2-way valve, which in its basic position provides communication of the ABS control space with the brake circuit, and in its excited position blocks that communication and provides communication between the ABS control space and a brake fluid storage tank. A third 2/2-way solenoid control valve, which in its basic position shuts off a connection of the ASR outlet pressure space from the main brake line of the brake circuit would be moved to an excited position by an ASR function control signal, wherein the ASR outlet pressure space of the hydraulic cylinder is connected to the main brake line portion leading to the at least one wheel brake.

As a variant of this latter system, the function control valve comprises a 3/2-way displacement control valve which, after a small fraction of a pressure build-up stroke of the brake piston reducing the outlet pressure space of the brake unit, would be moved out of its basic position, in which it connects the ABS control space of the hydraulic cylinder to a brake fluid storage tank of the brake system and shuts off the ABS control space from the brake circuit of the vehicle wheels into its excited position in which the ABS control space is connected to brake circuit and is shut off from the brake fluid storage tank. Here, an electrically actuated 3/2-way solenoid control valve which, by an output signal coming from the electronic control unit of the control system in its propulsion ASR control mode would be moved out of its basic normal braking or braking subjected to the antilocking control position in which the outlet pressure space of the brake unit and the ASR outlet pressure space of the hydraulic cylinder would be connected to one another, into its excited position, in which only the ASR outlet pressure space of the hydraulic cylinder is connected to the brake circuit of the controllable vehicle wheels and the outlet pressure space of the brake unit would be shut off from this brake circuit.

In either of these latter two systems, a one-way valve could be inserted between the ASR outlet pressure space of the hydraulic cylinder and the main brake line of the brake circuit in parallel with the third solenoid control valve wherein the one-way valve can open as a result of a higher pressure in the main brake line than in the ASR outlet pressure space of the hydraulic cylinder to permit flow from the main brake line into the ASR outlet pressure space to provide over pressure protection.

A still further alternative would be to have the function control valve comprises a 3/2-way displacement control valve which, after a small fraction of a pressure build-up stroke of the brake piston reducing the outlet pressure space of the brake unit, be moved out of its basic position, in which it connects the ABS control space of the hydraulic cylinder to the brake fluid storage tank of the brake system and shuts off the ABS control space from the brake circuit of the vehicle wheels, into its excited position in which the ABS control space is connected o the brake line of the controllable brake circuit and is shut off from the brake fluid storage tank. Here, a first 2/2-way solenoid control valve would be moved out of its basic normal braking or braking subjected to the antilocking ABS control position by the control system in the propulsion control mode, wherein it connects the outlet pressure space of the brake unit to the ASR outlet pressure space of the hydraulic cylinder into its excited position braking this connection.

Also provided would be a second 2/2-way solenoid control valve which is moved out of its basic normal braking or propulsion ASR control position by a control signal linked to an activation of the control system in its antilocking control mode where it connects the ASR outlet pressure space of the hydraulic cylinder directly to the brake line of the brake circuit to a blocking position closing off the connection.

Another embodiment would have the function control valve comprise two jointly hydraulically activatable valves which, in their basic normal braking and braking subject to the antilocking ABS control position, connect the outlet pressure space of the brake unit with the ASR outlet pressure space of the hydraulic cylinder and also connect the ABS control space of the hydraulic cylinder with the brake circuit of the vehicle wheels, The two function control valves would be movable to their excited propulsion ASR control mode position by the outlet pressure of the auxiliary pressure source, wherein the ASR outlet pressure space would be connected to the brake circuit and the the ABS control space of the hydraulic cylinder is connected to a brake fluid storage tank. In this arrangement, an electrically activatable function control valve would be movable by the control system into its excited propulsion control position, in which a control pressure would be fed into the control spaces of the two hydraulically activatable valves to move them from their basic position to their excited positions, and a relief flow path for relieving the control pressure spaces of the two hydraulically controlled valves which is either open in the basic position of these two valves, or which can be opened at least temporarily by a further control valve would be provided.

Another alternative would have a 2/2-way solenoid control valve which is moved out of its basic propulsion ASR control position by the control system, in which the outlet pressure space of the brake unit is connected to the ASR outlet pressure space of the hydraulic cylinder, into its excited position where it blocks that connection. Here, two hydraulically activatable control valves would be set in basic normal braking and braking subjected to the antilocking ABS control positions when they are connected to a pressureless hydraulic actuation source and to their excited position when connected to a pressure hydraulic source for ASR propulsion control mode. One of the two hydraulically controlled valves would be designed as a 3/2-way valve which, in its basic position connects the ABS control space of the hydraulic cylinder to the brake circuit and in its excited position connects the ABS control space to a pressureless brake fluid storage tank, while the other of the valves would be designed as a 2/2-way valve which, in its basic position blocks the connection of the ASR outlet pressure space of the hydraulic cylinder from the brake circuit and in its excited position connects the ASR outlet pressure space to the brake circuit. Here too, a displacement controlled 2/2-way valve which, after a small fraction of the brake pressure build-up stroke of the brake piston reducing the outlet pressure space of the brake unit would move out of its basic position, connecting the two hydraulic controlled valves to the pressure actuation source at the drive pressure space of the hydraulic cylinder, into an excited position in which the hydraulic valves are disconnected from the drive pressure space and are connected to the pressureless source. This system also lends itself to having a one-way valve inserted between a common control connection of the two hydraulically activatable valves and the drive pressure space of the hydraulic cylinder which is open as a result of a relatively higher actuation pressure for the two hydraulic valves than the pressure in the drive pressure space of the hydraulic cylinder to relieve the actuation pressure if it becomes too large.

Still yet another arrangement is possible wherein the pedal operates a brake piston to produce a brake pressure in the outlet pressure space, in that the function control valve can comprise three mechanically displaceably controlled valves which, after a small fraction of a brake pressure build-up stroke of the brake piston reducing the outlet pressure space of the brake unit, move from their basic non-actuated state of the brake system or propulsion ASR control mode positions into an excited normal braking or braking subjected to the antilocking ABS control positions, and wherein the particular control mode is selected by connecting the drive pressure space of the hydraulic cylinder to the high pressure outlet of the auxiliary pressure source. Under such a system, a first of the mechanically displaceable valves would be a 2/2-way valve which, in its basic position, blocks a flow from an inlet line to an outlet line for connecting the outlet pressure space of the brake unit with the main brake line of the brake circuit and with the ASR outlet pressure space of the hydraulic cylinder where the valve is moved to its active position when the brake system is actuated to open the connection between the pressure space and both the main brake line and the ASR outlet pressure space. A second of the mechanically displaceable controlled 2/2-way valve would be provided which, in its basic position, connects outlet line leading from the first mechanically displaceable valve to the main brake line branching off to the wheel brakes, and in its excited position closing off the outlet line to the main brake line, and a third mechanically displaceable controlled 3/2- way valve would, in its basic Position connects the ABS control space of the hydraulic cylinder to a brake fluid storage tank and in its excited brake system actuated position connects the ABS control space to the main brake line of the brake circuit.

Another alternative would have three mechanically displaceable controlled valves in a basic non-actuated state of the brake system Position, connect the ASR outlet pressure space of the hydraulic cylinder to the main brake line of the controllable brake circuit and disconnect the ABS control space from the main brake line and connect it to a brake fluid storage tank of the brake system. These valves would be movable to an excited position to connect the ABS control space to the main brake line and closes off the connection to the brake fluid storage tank as well as the connection between the ASR outlet pressure space and the ABS control space. Here, an electrically activatable function control valve, actuated by a control signal in response to the activation of the propulsion ASR control would move from a basic position, in which the outlet pressure space of the brake unit is connected to the ASR outlet pressure space of the hydraulic cylinder to an excited blocking position closing this connection.

The three mechanically displaceable controlled valves would comprise 2/2-way change over valves with the first of these connecting the ASR outlet pressure space of the hydraulic cylinder to the main brake line of the static brake circuit, when in its basic position. The second, in its basic position, would block a connection of the ABS control space to the main brake line, while the third, when in its basic position, would connect the ABS control space to a brake fluid storage tank.

Here, a 3/2-way valve would be movable from a basic position connecting the ABS control space to the brake fluid storage tank into an excited position when the brake unit is actuated to close the connection of the ABS control space to the storage tank, and would instead connect the ABS control space to the main brake line of the static brake circuit.

Further designs of control valve arrangements which are alternative to those mentioned above and which make it possible to produce the antilocking and propulsion control system according to the invention by especially simply designed hydraulic cylinders as brake pressure regulating members are possible.

A first of these would comprise a displacement controlled valve which, in a basic non-actuated state of the brake system position, connect the ABS control space of the hydraulic cylinder to a pressure relief means and closes off an initial line leading from the outlet pressure space of the brake unit to the main brake line of the static brake circuit via a further line which also connects with the ASR outlet pressure space of the hydraulic cylinder and which, in an excited brake actuated position connects the ABS control space of the hydraulic cylinder to the main brake line of the brake circuit while also connecting the outlet pressure space of the brake unit to the ASR outlet pressure space of the hydraulic cylinder through the initial and further lines. Here, a first activatable function control valve actuated by the control during normal braking to its basic position connecting the outlet pressure space of the brake unit to the main brake line would be moved by the control into its excited position for the duration of both an antilocking ABS cycle and a propulsion ASR control cycle wherein the connection between the outlet pressure space and the main brake line is closed. A second activatable function control valve would be actuated by the control means into its basic position in which it blocks a flow path leading from the ASR outlet pressure space of the hydraulic cylinder to the main brake line and which, by an output signal linked to the activation of the propulsion ASR control, is moved into its excited position in which the ASR outlet pressure space is connected to the main brake line of the static brake circuit. The first activatable function control valve would be designed as a hydraulically activatable 2/2-way valve which is activated into its blocking position by the outlet pressure of the auxiliary pressure source via a drive/control valve which makes a connection between the drive pressure space of the hydraulic cylinder and the auxiliary pressure source with the hydraulically activatable valve.

A second embodiment would comprise a displacement controlled valve arrangement which, in the basic non-actuated state of the brake system position, connects the ABS control space of the hydraulic cylinder to a pressureless source while also blocking an initial line connecting the outlet pressure space to the brake unit of the main brake line of the static brake circuit through an outlet line and a further valve element of the mechanically actuable valve. Here, the ASR outlet pressure space of the hydraulic cylinder would be likewise connected via this further valve element to the main brake line. Also, the pedal operating a brake piston to produce a brake pressure in the outlet pressure space when the brake system would be actuated, so that, after a small fraction of the pressure build-up stroke of the brake piston reduces the outlet pressure space of the brake unit, the brake piston would move the displacement control valve to its excited position to connect the ABS control space to the main brake line branching off to the wheel brakes of the main brake circuit as well as to shut off the inlet line of the main brake line starting from the outlet pressure space of the brake unit from the outlet line and to shut off the connection of the ASR outlet pressure space of the hydraulic cylinder from the main brake line. Also provided would be a change over valve which, in its basic through flow position connects the ASR outlet pressure space of the hydraulic cylinder to its ABS control space and when it is moved into its excited blocking position disconnecting the ASR outlet pressure space from ABS control space by the control when and for as long as the antilocking ABS or propulsion ASR control is activated.

Preferably, the change over valves would be designed as 2/2-way solenoid valves which are moved into blocking position by an electrical signal appearing for the duration of activation of the control system, or as a hydraulically controlled valve which is moved into its blocking position when and as long as the auxiliary pressure source is coupled to an activation drive pressure space of the valve via the drive/control valve. Here also, there would be a change over valve which, in its basic through flow position connects the outlet pressure space of the brake unit to the main brake line of the static brake circuit and which would be moved into its excited position, for blocking this connection by the control system when and for as long as the control system is activated.

A position indicator which responds to the position of the piston limiting the outlet pressure space of the brake unit and which, in a simplest case, can be designed as a limit switch provides, in a simple way, a safeguard for the system during brake pressure reduction phases of the antilocking control. It is used to prevent too much brake fluid from flowing back into the brake unit and finally into the brake fluid storage tank, as a result of which, when it is necessary for the propulsion control to respond immediately after an antilocking control cycle, its functioning capacity could be impaired. Here, the position indicator would generate an output signal causing the auxiliary pressure source to be disconnected from the drive pressure space of the hydraulic cylinder when, during the course of an antilocking ABS control phase, the piston of the brake unit reaches its basic position or a position immediately adjacent to this.

Having the control valve arrangement comprise two 2/2-way solenoid control valves, one of which in its basic position shuts off the pressure outlet of the auxiliary pressure source from the drive pressure space of the hydraulic cylinder and in its excited position connects this pressure outlet to the auxiliary pressure source, while the other valve, in its basic position connects the drive pressure of the hydraulic cylinder to a pressureless tank of the auxiliary pressure source and in its excited position closes off this connection to the pressureless tank, provides that, in the event of a leak of the valve provided for connecting the drive pressure space of the hydraulic cylinder to the auxiliary pressure source, there cannot be an undesirable pressure build-up in the drive pressure space of the hydraulic cylinder, since pressure medium can flow off to the storage tank of the auxiliary pressure source via the through flow path of the other valve intended for relieving the drive pressure space of the hydraulic cylinder.

Other objects, advantages and novel features of the present invention will become apparent from the following detailed description of the invention when considered in conjunction with the accompanying drawings.

DETAILED DESCRIPTION OF THE DRAWINGS

Figure 1:
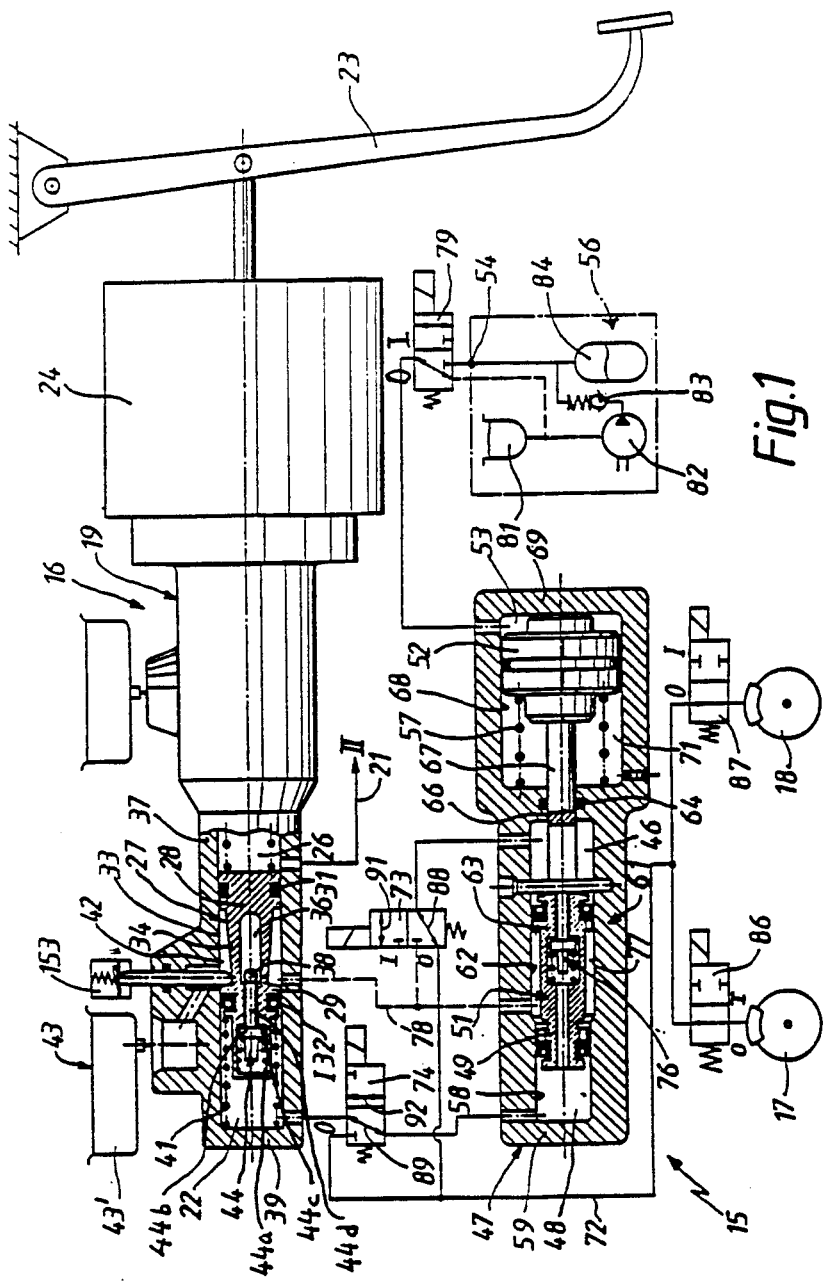
FIG. 1 shows, in a simplified block-diagram representation, a first exemplary embodiment of an antilocking ABS and propulsion ASR control system according to the invention for a road vehicle with rear axle drive, wherein a hydraulic cylinder is used as a brake pressure regulating member for both control modes and with a control valve arrangement for function control composed solely of solenoid valves.

FIG. 1 shows the functionally essential details of an antilocking and propulsion control system 15 for a road vehicle having a brake system 16 which, for the purpose of the explanation, is shown as a hydraulic dual circuit brake system in which the rear wheel brakes 17 and 18 are combined to form a rear axle brake circuit I and the front wheel brakes (not shown) are combined to form a front axle brake circuit II, symbolized by a portion of its main brake line 21 extending from the brake unit 19 of the brake system 16. In a rear axle drive, the propulsion control has to take effect only on the rear axle.

The rear axle brake circuit I is designed as a static brake circuit connected to the secondary outlet pressure space 22 of a tandem master cylinder of a conventional type and connected to the brake unit 19, which master cylinder can be actuated by a brake pedal 23 via a pneumatic or hydraulic brake booster 24. The front axle brake circuit II is likewise designed as a static brake circuit which is connected to the primary outlet pressure space 26 of the tandem master cylinder brake unit 19. A secondary piston 27 defines one end of the primary outlet pressure space 26 of the tandem master cylinder 19, and separates it from the secondary outlet pressure space 22. The secondary piston 27 has two piston flanges 28 and 29, arranged at an axial distance from one another which correspond to the maximum stroke of the secondary piston 27, which are sealed with respect to the master cylinder bore 33 by annular gaskets 31 and 32. The cylinder bore 33 defines a radial limitation of the primary outlet pressure space 26 and a radial limitation of the secondary outlet pressure space 22.

The two piston flanges 28 and 29 are connected to one another by an intermediate piston piece 34. The secondary piston 27 is equipped with a longitudinal slot 36 which extends in an axial direction and through which a stop pin 38 radially passes. The stop pin 38 is firmly connected to the housing 37 of the brake unit 19 and extends perpendicularly relative to the plane of FIG. 1. The basic position of the secondary piston 27 of the brake unit 19, which corresponds to the non-actuated state of the brake system 16, occurs by contact of the left edge of the longitudinal slot 36 of the secondary piston 27, located adjacent piston flange 29, against the stop pin 38 fixed to the housing. The secondary piston 27 is forced into its basic position by a restoring spring 41 supported between piston flange 29 on the end wall 39 of the master cylinder housing 37. The position of the secondary piston 27 thus defines the axial direction of the secondary outlet pressure space 22.

The two piston flanges 28 and 29 of the secondary piston 27 and the bore 33 define a follow-up space 42 in the form of an annular gap about the intermediate piston piece 34, which gap is in constant communicating connection with that part 43' of the brake fluid storage tank 43, associated with the rear axle brake circuit I.

Integrated in the secondary piston 27 of the brake unit 19 is a central compensating valve 44 of a known design. In its basic open position shown (non-activated state of the brake system 16), the secondary outlet pressure space 22 of the brake unit 19 is placed in communication with follow-up space 42 and thus also with the part 43' of brake fluid storage tank 43. This central valve 44 is designed so that when the brake system 16 is actuated, as provided when the secondary piston 27 of the brake unit 19 has executed a small initial portion of its movement stroke, the central valve 44 assumes its blocking position, after which, during a further displacement of the secondary piston 27, the pressure build-up starts in the secondary outlet pressure space 22 and consequently in the rear wheel brakes 17 and 18.

In the FIG. 1 embodiment, the central valve 44 is designed in the form of a circular disc 44(b) which is forced by a valve spring 44(a), supported internally in the piston flange 9, up against valve seat 44(c) formed by an internal edge of flange 29, which opens into the longitudinal slot 36 of the secondary piston 27. A rear stop tappet 44(d) of the central valve 44 lifts circular disc 44(b) from its valve seat 44(c) when the stop tappet comes up against the stop pin 38 fixed to the housing and the secondary piston 27 approaches its basic position.

The above description of the brake system 16 applies to the exemplary embodiments to be explained later and is known per se.

The antilocking ABS and propulsion ASR control system 15 works, in control phases of the antilocking control ABS, on the principle of controlling brake pressure by varying the volume of an ABS control space 46 of brake pressure regulating member 47, which space is connected with the rear wheel brake cylinders 17, 18. In control phases of the propulsion control ASR, the control system 15 works on the known principle of decelerating a vehicle wheel tending to spin by activating its wheel brakes 17 and/or 18, until its drive slip remains within a range of values compatible both with sufficient driving stability and with good propulsion acceleration of the vehicle.

In the event that an ASR control action is activated in terms of the rear axle brake circuit I, the brake pressure regulating member 47 performs the function of a master cylinder which is connected to the rear axle brake circuit, instead of the brake unit 19. Here, an ASR outlet pressure space 48 is used for the propulsion control ASR function and is defined by the position of sealed flange 49 of regulating piston 51 of the brake pressure regulating member 47. The regulating piston 51 is displaceable in the direction of a brake pressure build-up in the ASR outlet pressure space 48 of the brake pressure regulating member 47 (to the left in FIG. 1), as a result of a pressure build up in a drive pressure space 53 adjacent drive piston 52, of the brake pressure regulating member 47 in cylinder 68 when the drive pressure space 53 is connected via solenoid valve 79 to the high-pressure outlet 54 of an auxiliary pressure source 56. When the drive pressure space 53 is relieved of pressure by solenoid valve 79 connecting the drive pressure space 53 to tank 81 of the auxiliary pressure source 56, the drive piston 52 is forced back towards its basic position (right hand side of cylinder 68) by a restoring spring 57 to produce a brake pressure reduction in the ASR outlet pressure space 48 and in the wheel brake 17 and/or 18.

In all the exemplary embodiments, the brake pressure regulating member 47 of the control system 15 is designed such that a displacement of the regulating piston 51 resulting from connection of its drive pressure space 53 to the outlet pressure of the auxiliary pressure source 56 leads to an increase in volume of the ABS control space 46 and to decrease in volume of the ASR outlet pressure space 48. Alternative brake pressure reduction phases of the antilocking control ABS and brake pressure build-up phases of the propulsion control ASR can be controlled as a result of a corresponding alternative connection of the wheel brake 17 and/or 18 to the particular functional ABS, ASR space 46 or 48 of the brake pressure regulating member 47 by initiating activation of the control system 15 into its two control modes by connecting the drive pressure space 53 of a brake pressure regulating member 47 to pressure from the auxiliary pressure source 56 under control of solenoid valve 79.

Before the several alternative embodiments of a function control valve arrangement suitable for selecting the particular control mode required are discussed below, the construction of a brake pressure regulating member 47, which forms the central functional element of the control system 15 and which can be used in conjunction with the different embodiments of the function control valve arrangement, will be explained first.

In the FIGS. 1–8 embodiments, the brake pressure regulating member 47 is designed as a single acting hydraulic cylinder having a drive piston 52 which is connected firmly to the regulating piston 51 forming a movable partition, defining both the ASR outlet pressure space 48 and the ABS control space 46.

The hydraulic cylinder 47 in the area about the ASR outlet pressure space 48 and the ABS control space 46 is designed as a step cylinder. A narrow bore step 58, closed off by the end wall 59 of the cylinder housing 61 and by the piston flange 49 of the regulation piston 51 defines the ASR outlet pressure space 48. A somewhat larger diameter bore step 62 contains a second diametrically correspondingly larger piston flange 63 of the regulating piston 51 which defines the ABS control space 46 with an intermediate wall 64 of the cylinder housing 61, equipped with a central bore 66 into which a piston rod 67, connecting the regulating piston 51 of the hydraulic cylinder 47 to its drive piston 52, is displaceably guided in a pressure tight manner.

The drive piston 52 is arranged in an even larger bore step 68 of the cylinder housing 61 to define with an end wall 69 of the cylinder housing 61, the drive pressure space 53, connectable to the auxiliary pressure source 56. A pressureless separating space 71 is formed between the intermediate wall 64 and the drive piston 52 and contains a restoring spring 57 which is supported axially between the intermediate wall 64 and the drive piston 52 to bias the composite regulating piston 51-drive piston 52 of the hydraulic cylinder 47 into its basic position defining a minimum volume of the ABS control space 46 and a maximum volume of the ASR outlet pressure space 48.

The pressureless separating space 71 between the drive Pressure space 53 and the ABS control space 46 provides the necessary media separation between the drive circuit and the ABS and ASR function control circuits.

The regulating piston 51 is designed so that the effective cross-sectional area of its flange 49 limiting the ASR outlet pressure space 48, equal to the cross-sectional area of the smaller bore step 58 and the effective area of the flange 63 limiting the ABS control space 46, equal to the difference between the cross-sectional area of the larger bore step 62 and the cross-sectional area of the central bore 66 of the intermediate wall 64, are approximately equal to each other, i.e., the two effective areas of the flanges 49 and 48 are equal within a margin of ±15%, and preferably the same.

In a pressure reduction control phase of the antilocking control, the rear axle brake circuit I is connected to the ABS control space 46 via a first control valve 73 and line 72, while the ASR outlet pressure space 48 of the hydraulic cylinder 47 is connected to the secondary outlet pressure space 22 of the brake unit 19 via a second control valve 74 when the two control valves 73, 74 are positioned in their basic "O" position. An antilocking ABS or propulsion ASR control mode is obtained depending on the switching state of the control. The quantity of brake fluid received by the ABS control space 46 from the wheel brake or wheel brakes 17 and/or 18 subjected to the control is virtually the same as that quantity of brake fluid which, in such a pressure reduction phase, is forced out of the ASR outlet pressure space 48 of the hydraulic cylinder 47 into the secondary outlet pressure space 22 of the brake unit 19. As a result of the increase of pressure in space 22, a reaction indicative of the activation of the antilocking ABS control becomes detectable on the brake pedal 23 through the associated retreat of the secondary piston 27 of the brake unit 19 and consequently also of the primary piston (not shown). Additionally, the secondary outlet pressure space 22 remains full of fluid and will not empty as a result of several successive pressure reduction phases of the antilocking ABS control.

Integrated in the regulating piston 51 of the hydraulic cylinder 47 is a central valve 76, the design of which is identical to that of the central valve 44 of the secondary piston 27 of the brake unit 19. The central valve 76 is designed and arranged to assume the basic position of the regulating piston 51 as long as the control system 15 is not activated, or after a control cycle has been terminated, or immediately before its conclusion. In this basic position (shown in FIG. 1), the central valve 76 is in an open position, in which the ASR outlet pressure space 48 and the ABS control space 46 of the hydraulic cylinder 47 are in communication with one another. When the control system 15 is activated and after the composite piston structure 51, 52 of the hydraulic cylinder 47 has displaced a small initial portion of its possible working stroke, the control valve 76 assumes its blocking position to close communication between the ASR outlet pressure space 48 and the ABS control space 46 of the hydraulic cylinder 47.

An annular gap compensating space 77 of the hydraulic cylinder 47 extending between the flanges 49 and 63 of the regulating piston 51, is connected via compensating line 78 to the follow-up space 42 of the brake unit 19, located between the piston flanges 28 and 29 of the secondary piston 27 of the brake unit 19. This follow-up space 42 is in turn connected to the brake fluid storage tank 43, 43' of the brake system 16.

A 3/2-way solenoid valve 79 is provided for controlling the activation of the control system 15. In the basic "O" position of this solenoid valve 79, corresponding to the non-activated state of the control system 15, the drive pressure space 53 of the hydraulic cylinder 47 is connected to the tank 81 of the auxiliary pressure source 56 and is shut off from the high-pressure outlet 54 of the latter. The auxiliary pressure source 56 comprises: a pressure accumulator 84 which can be charged by a charging pump 82 via an accumulator charging valve 83 and has an outlet pressure which is maintained at a minimum level. In order to activate the control system, the 3/2-way solenoid valve 79 is changed over to its excited "I" position, in which the outlet pressure of the auxiliary pressure source 56 is fed into the drive pressure space 53 of the hydraulic cylinder 47.

Within the control system 15, brake pressure regulating valves 86 and 87 are provided to the rear wheel brakes 17 and 18, respectively. Brake pressure regulating valves 86, 87 are 2/2-way solenoid valves, the basic "O" position of which provides an open flow connection in which brake pressure can be built up or reduced in the wheel brake 17 or 18 via main brake line 72. In an excited "I" position, these brake pressure regulating valves block flow into and out of the particular wheel brakes 17 or 18, and hence wheel brake pressure is kept constant at the value previously activated and brake pressure build-up is prevented.

The activation signals necessary for the appropriate activation of the control system 15 according to the braking situation needed, which operate the pressure supply control valve 79, the brake pressure regulating valves 86 and 87 and, if necessary, the function control valves 73 and 74 in a stipulated sequence and in combination is performed by a electronic control unit (not shown), which generates these control signals as a result of a processing, carried out according to known criteria, of electrical output signals proportional to wheel speeds, coming from wheel speed sensors (likewise not shown) by which the movement behavior of the vehicle wheels is monitored continuously. There is no need to describe the specific functional elements of the control system 15, since many versions are known, or at the very least, can be produced by a person skilled in the electronic circuitry art, knowing the intended control purpose desired. Since these specifics are not necessary for an understanding of how to make or use the invention they have been omitted.

In the exemplary embodiment according to FIG. 1, the first function control valve 73 and the second function control valve 74 are designed as 3/2-way solenoid valves which assume their respective basic "O" position both during normal braking (braking not subjected to the antilocking control), and in braking subjected to the antilocking control.

In the basic "O" position of the first solenoid valve 73, the ABS control space 46 is connected, via valve through flow path 88 to main brake line 72 branching off to the rear wheel brakes 17 and 18 of the rear axle brake circuit I.

In the basic "O" position of the second solenoid valve 74 of the function control valve arrangement, the secondary outlet pressure space 22 is connected, via valve through flow path 89 to the ASR outlet pressure space 48 of the hydraulic cylinder 47.

In the basic position of the Composite piston structure 51, 52 of the hydraulic cylinder 47, corresponding to the non-activated state of the control system 15 in which central valve 76 assumes its open position, the ASR outlet pressure space 48 also communicates with the ABS control space 46 of the hydraulic cylinder 47. During normal braking, the outlet pressure generated in the secondary outlet pressure space 22 of the brake unit 19, as a result of the actuating of the latter, is thus fed via the second function control valve 74 into the ASR outlet pressure space 48 of the hydraulic cylinder 47 and onward via the open central valve 76 into the ABS control space 46 and from there, through flow path 88 of the first solenoid valve 73, open in the basic "O" position, into main line 72 leading to the rear axle brakes.

When the control system 15 is activated into its antilocking ABS control mode by coupling the drive pressure space 53 of the hydraulic cylinder 47 to the high-pressure outlet 54 of the auxiliary pressure source 56, the regulating piston 51 experiences a displacement in the direction of an increase of the ABS control space 46 and a decrease of the volume of the ASR outlet pressure space 48 of the hydraulic cylinder 47. The central valve 76 of the regulating piston 51, after a small initial portion of the regulating stroke of the regulating piston 51, will assume its blocking position, ceasing communication between the ASR outlet pressure space 48 and the ABS control space 46. The ASR outlet pressure space 48 is now connected only to the outlet pressure space 22 of the brake unit 19 via the through flow path 89 of the second control valve 74, while the ABS control space 46 is connected, via the through flow path 88 of the first control valve 73 only to the main brake line 72 leading to the wheel brakes 17 and 18 of the rear axle brake circuit I.

Brake fluid can flow into the ABS control space 46 from the wheel brakes 17 and/or 18 under the antilocking ABS control, with the result that a corresponding quantity of brake fluid is forced back into the secondary outlet pressure space 22 of the brake unit 19 by regulating piston 51.

Brake pressure rebuild up phases are controlled by switching the pressure supply control valve 79 back into its basic "O" position for the duration of such phases. Brake pressure holding phases on the particular wheel brakes 17 and/or 18 can be controlled by changing its respective brake pressure regulating valves 86 and/or 87 into the blocking "I" position.

When the control system 15 is activated by the ASR propulsion control, the pressure supply control valve 79 and the two solenoid valves 73 and 74 of the function control valve arrangement are moved into their excited "I" positions and the connection between the ASR outlet pressure space 48 and the ABS control space 46 of the hydraulic cylinder 47 is shut off as a result of the closing of the central valve 76. In the excited "I" position, the ABS control space 46 of the hydraulic cylinder 47 is connected to the compensating line 78 via the alternative through flow path 91 of the first solenoid valve 73 of the function control valve arrangement. Furthermore, in the excited "I" position of the second solenoid valve 74 of the function control valve arrangement, the ASR outlet pressure space 48 of the hydraulic cylinder 47 is connected, via through flow path 92 to the main brake line 72 leading to the rear wheel brakes 17 and 18 and is shut off from the secondary outlet pressure space 22 of the brake unit 19. In control phases of the ASR propulsion control, the hydraulic cylinder 47 acts as if it were a master cylinder for the rear axle brake circuit. In this situation, a brake pressure reduction phase of the propulsion control can be controlled by changing the drive control valve 79 to its basic "O" position. In the ASR propulsion control, brake pressure holding phases on the rear wheel brakes 17 and/or 18 are controlled by moving the respective brake pressure regulating valves 16 and/or 18 into their excited "I" position.

By the function control valve arrangement 73, 74 and control 76, the following functions are therefore performed:

(a) in normal braking not affected by the antilocking ABS control, the outlet pressure space 22 of the brake unit 19 assigned to the controllable brake circuit, the ASR outlet pressure space 48, and the ABS control space 46 of the hydraulic cylinder 47 are each connected to the wheel brakes 17 and 18 via the brake pressure regulating valves 86 and 87;

(b) during braking subjected to the antilocking ABS control, the ABS control space 46 alone is connected to the main brake line 72 of the controllable brake circuit I and the ASR outlet pressure space 48 of the hydraulic cylinder alone is connected to the outlet pressure space 22 of the brake unit 19;

(c) when the propulsion ASR control responds, the outlet pressure space 22 of the brake unit 19 is shut off from the wheel brakes 17 and 18, the ABS control space 46 is connected to the pressureless brake fluid storage tank 43, 43' of the brake system 16, and the ASR outlet pressure space 48 of the hydraulic cylinder 47 is connected to the main brake line 72 leading to the wheel brakes 17 and 18.

The embodiments of FIGS. 2 to 11 differ essentially from that of FIG. 1 in the form taken by the function control valve arrangements and modifications in the hydraulic cylinder which can be used with these different arrangements.

Figure 2:
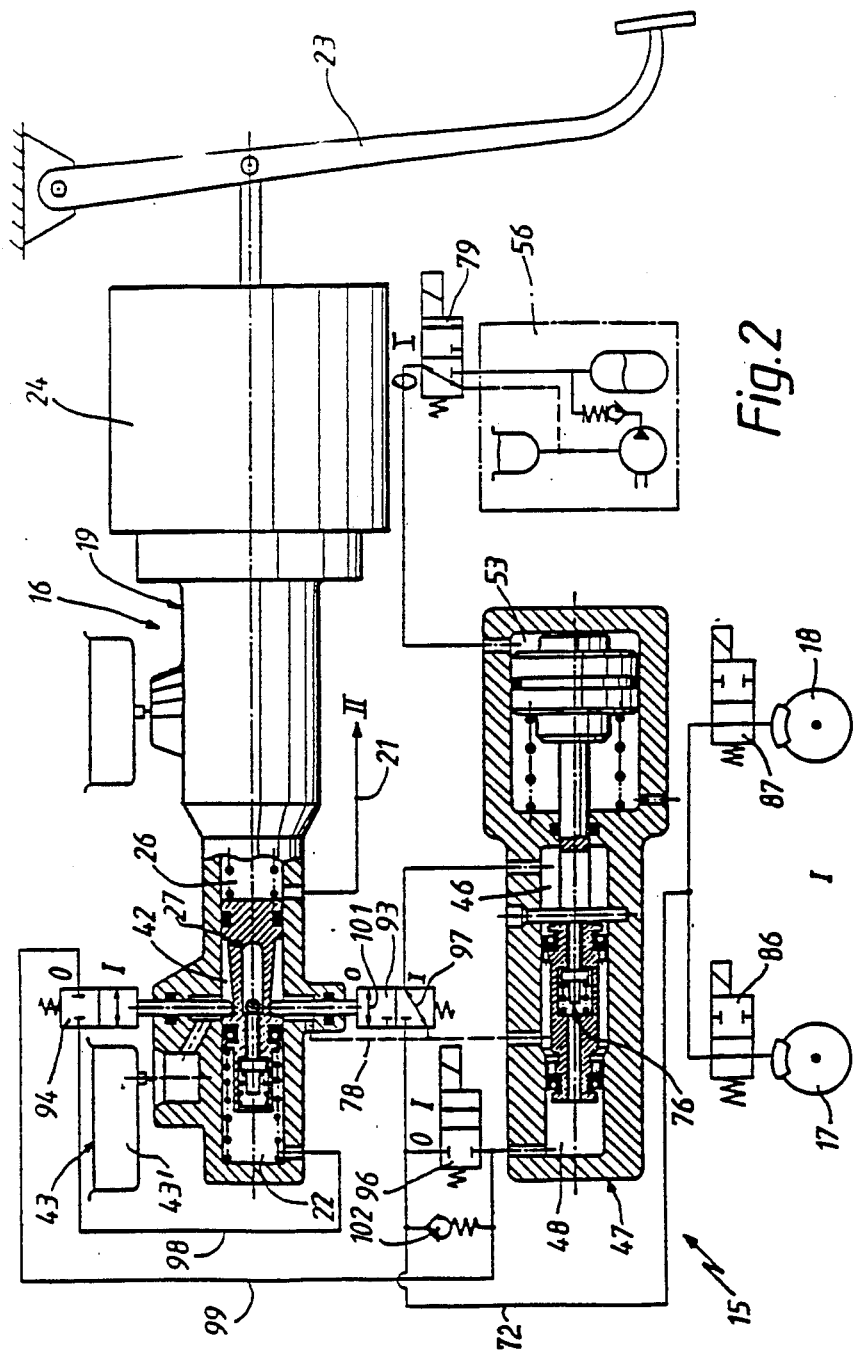
FIGS. 2 to 8 show respectively, in a representation corresponding to that of FIG. 1, further exemplary embodiments, corresponding in functional terms to the exemplary embodiment according to FIG. 1, of the antilocking ABS and propulsion ASR control system according to the invention, in which solenoid valves, displacement control valves and/or hydraulically activated valves are used alternatively, or in combination for producing the function control valve arrangement.

In the embodiment according to FIG. 2, the function control valve arrangement comprises two displacement controlled change over valves 93, 94, in addition to the central valve 76 of the hydraulic cylinder 47. These change over valves 93, 94 assume their basic "O" positions in the basic (not actuated state of the brake system 16) position of the secondary piston 27 of the brake unit 19 and, after the secondary piston 27 of the brake unit 19 has executed a small initial portion of its brake pressure build-up stroke, these change over valves 93, 94 move from their basic "O" positions into their active through flow positions. Concurrently, a 2/2-way solenoid valve 96 is moved to its active "I" position. Displacement controlled valve 93 is designed as a 3/2-way valve, and in its basic "O" position connects the ABS control space 46 via through flow path 97 to the compensating line 78 and the follow-up space 42 of the brake unit 19 where it empties into the brake fluid storage tank 43, 43'.

Displacement controlled change over valve 94 is designed as a 2/2-way valve, which in its basic "O" blocking position, interrupts the connection of line 98 to the main brake line 99 of the rear axle brake circuit I, to prohibit the secondary outlet pressure space 22 from connecting to an intermediate portion 99 of the main brake line of the rear axle brake circuit I leading to the ASR control pressure space 48 of the hydraulic cylinder 47.

In the active "I" position, the displacement controlled 3/2-way valve 93 connects the ABS control space 46 of the hydraulic cylinder 47 to the main brake line 72 of the rear axle brake circuit I via the through flow path 101.

In the active "I" position of the 2/2-way displacement controlled valve 94, the secondary outlet pressure space 22 is connected via the main brake line portions 98 and 99 to the ASR outlet pressure space 48 of the hydraulic cylinder 47.

In the basic "O" position of the 2/2-way solenoid valve 96, the ASR outlet pressure space 48 of the hydraulic cylinder 47 is blocked off from the main brake line 72 of the rear axle brake circuit I branching off to the wheel brakes. In the excited "I" position, the 2/2-way solenoid valve 96 connects ASR outlet pressure space 48 of the hydraulic cylinder 47 to the main brake line 72 branching off to the wheel brakes.

In normal brake operations, the pressure supply control valve 79 and the 2/2-way solenoid valve 96 of the function control valve arrangement remain in their basic "O" positions, and only the displacement controlled valves 93 and 94 are changed over into their active "I" through flow positions.

Activation of the antilocking ABS control mode of the control system 15 takes place by change over of the 3/2-way solenoid valve 79 to its active "I" position which connects auxiliary pressure source 56 to the drive pressure space 53 of the hydraulic cylinder 47.

The control system 15 operates in the propulsion ASR control mode when in the non-actuated state of the brake system 16, the two displacement controlled change over valves 93 and 94 are in their basic "O" positions, the pressure supply control valve 79 has been switched into its excited "I" position, and the 2/2-way solenoid valve 96 of the function controlled valve arrangement has switched into its excited "I" through flow position.

In the embodiment according to FIG. 2, there is a one-way valve 102 which is connected in parallel to the 2/2-way solenoid valve 96 of the function control valve arrangement. This one-way valve 102 is opened by the pressure in main main brake line portion 72 exceeding that in the ASR outlet pressure space 48 of the hydraulic cylinder 47. This one-way valve 102 allows brake fluid to flow out of the wheel brakes 17 and 18 back into the ASR outlet pressure space 48 of the hydraulic cylinder 47 even in the blocking "O" position of the 2/2-way solenoid valve 96. Thus a compensating flow can take place towards the brake fluid storage tank 43, 43' if the brake fluid expands thermally in the wheel brakes 17 and 18.

Figure 3:
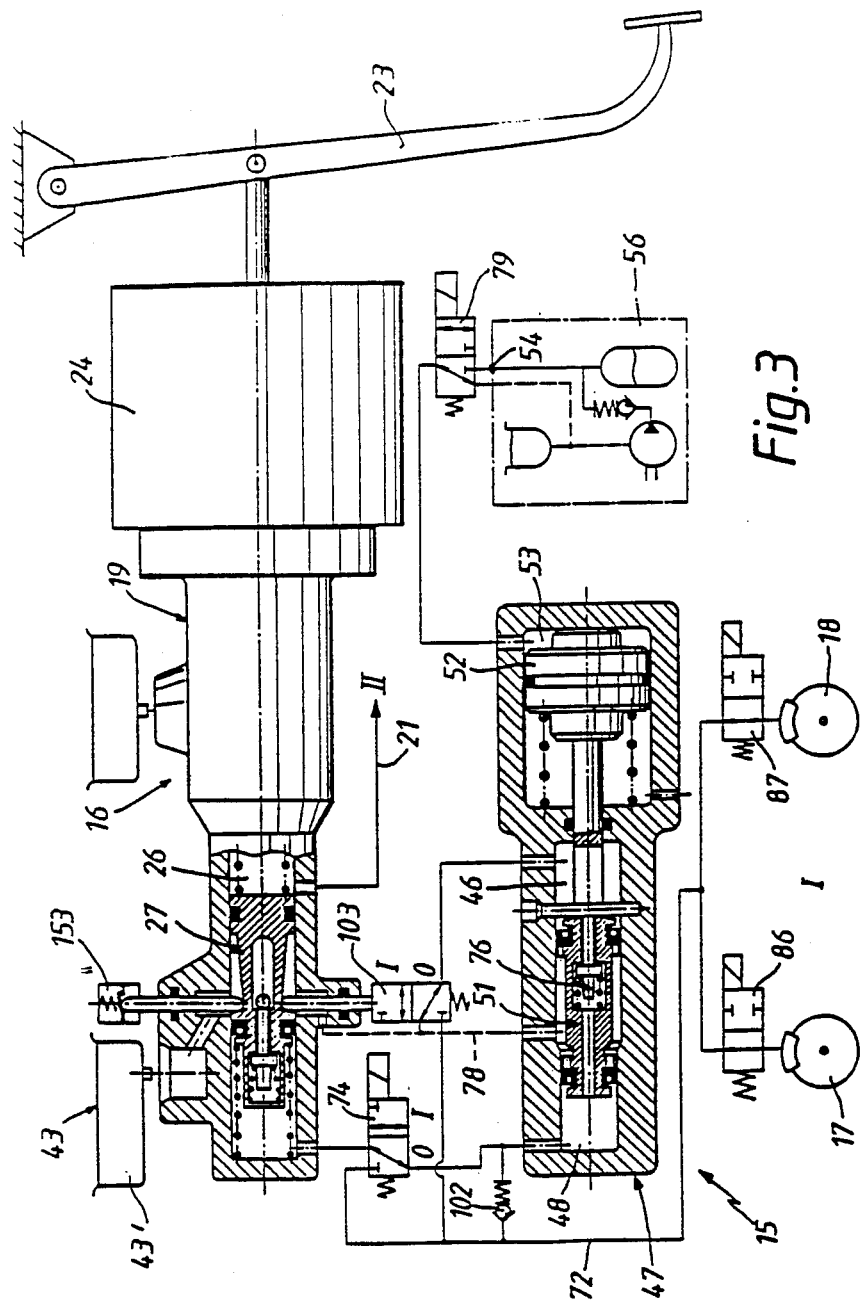

The embodiment according to FIG. 3 differs from that according to FIG. 1 in that, instead of the first function control valve 73 being activated as a solenoid valve, a displacement controlled 3/2-way valve 103 is provided The basic "O" position of this displacement controlled valve 103 corresponds functionally to the excited "I" position of the 3/2-way solenoid valve 73 of FIG. 1. After a small initial portion of the brake pressure build-up stoke of the secondary piston 27 of the brake unit 19, the displacement controlled valve 103 assumes its excited "I" position, which corresponds functionally to the basic "O" position of the 3/2-way solenoid valve 73 of the function control valve arrangement according to FIG. 1.

In addition, a one-way valve 102 is provided between the main brake line 72 and the line leading from the ASR outlet Pressure space 48 and the second control valve 74. This one-way valve 102 is functionally analogous to the one-way valve 102 of FIG. 2. Otherwise, there is design identity and functional analogy with the embodiment according to FIG. 1.

Figure 4:
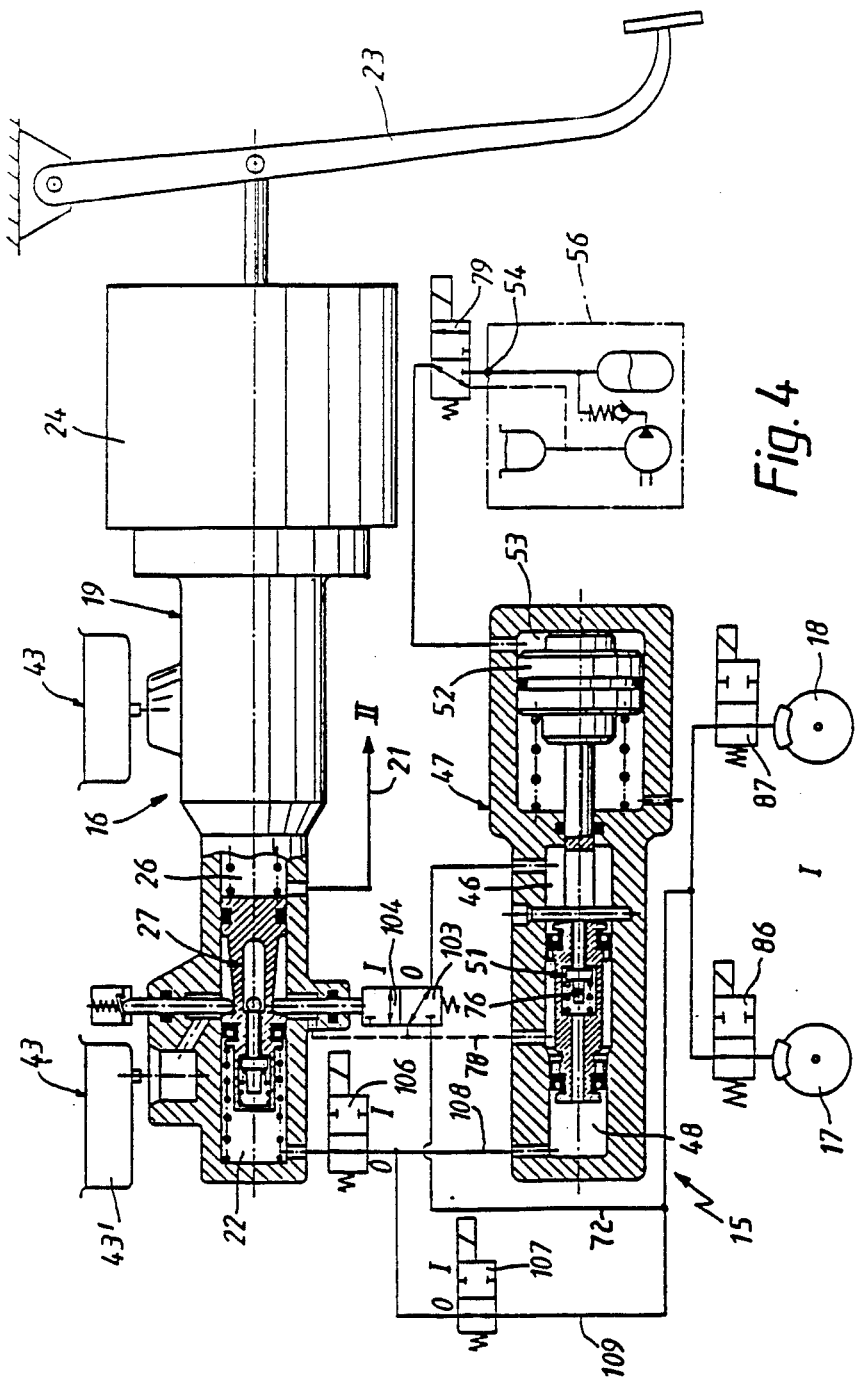

The embodiment according to FIG. 4 differs from the embodiments according to FIGS. 1 to 3 merely in the configuration of the function control valve arrangement 73, 74. In FIG. 4, a 3/2-way valve 103 is controlled as a function of the operational stroke of the secondary piston 2 of the brake unit 19 and, after a small fraction of the pressure build-up stroke of this secondary piston 27, is changed over from its basic "O" position in which the ABS control space 46 of the hydraulic cylinder 47 is connected via the compensating line 78 to the brake fluid storage tanks 43, 43' of the brake system 16 and is blocked off from the rear axle brake circuit I, into its excited "I" position in which the ABS control space 46 is connected via the through flow flow path 104 to the main brake line 72 of the rear axle brake circuit branching to the wheel brakes 17 and 18 of the rear axle brake circuit I and is blocked off from the brake fluid storage tank 43, 43'.

The other function control valve is a 2/2-way solenoid valve 106 in which the basic "O" position is its through flow position and the excited "I" position is its blocking position. Also provided is a second 2/2-way solenoid valve 107 in which its basic "O" position is its through flow position and its excited "I" position is its blocking position.

In its basic "O" position, the first 2/2-way solenoid valve 106 opens a pressure medium flow path 108, which leads from the secondary outlet pressure space 22 of the brake unit 19 to the ASR outlet pressure space 48 of the hydraulic cylinder 47. It is controlled into its blocking "I" position by a signal associated with an activation of the control system 15 in its ASR propulsion control mode.

In its basic "O" position, the second 2/2-way solenoid valve 107 opens a pressure medium flow path 109, which leads from the ASR outlet pressure space 48 of the hydraulic cylinder 47 directly to main brake line 72 of the rear axle brake circuit I branching off to the wheel brakes 17 and 18. This second 2/2-way solenoid valve 107 is controlled into its blocking "I" position by a signal associated with an activation of the control system 15 in its antilocking ABS control mode. In the embodiment according to FIG. 4, the activation of the control system 15 in the ABS or ASR control modes is achieved by changing over the pressure supply control valve 79 into its excited "I" position In the embodiment according to FIG. 5, the function control valve arrangement comprises a first hydraulically actuable 3/2-way valve 111 and a second hydraulically actuable 3/2-way valve 112, which are jointly hydraulically actuable by the pressure in line 116, 117 to move against their bias springs from an active "I" position to their basic "O" position. For joint actuation of these two 3/2-way valves 111 and 112, a 2/2-way solenoid valve 113 is provided as a further function control valve, which is switched to allow the supply pressure inlet 114 of the propulsion pressure space 53 of the hydraulic cylinder 47 to be connected to line 116, 117. The basic "O" position of this further function control valve 113 is the blocking position and its excited "I" position is the through flow position. The hydraulic cylinder 47 is identical with regard to design and function to the hydraulic cylinder shown in each of FIGS. 1 to 4.

Figure 5:
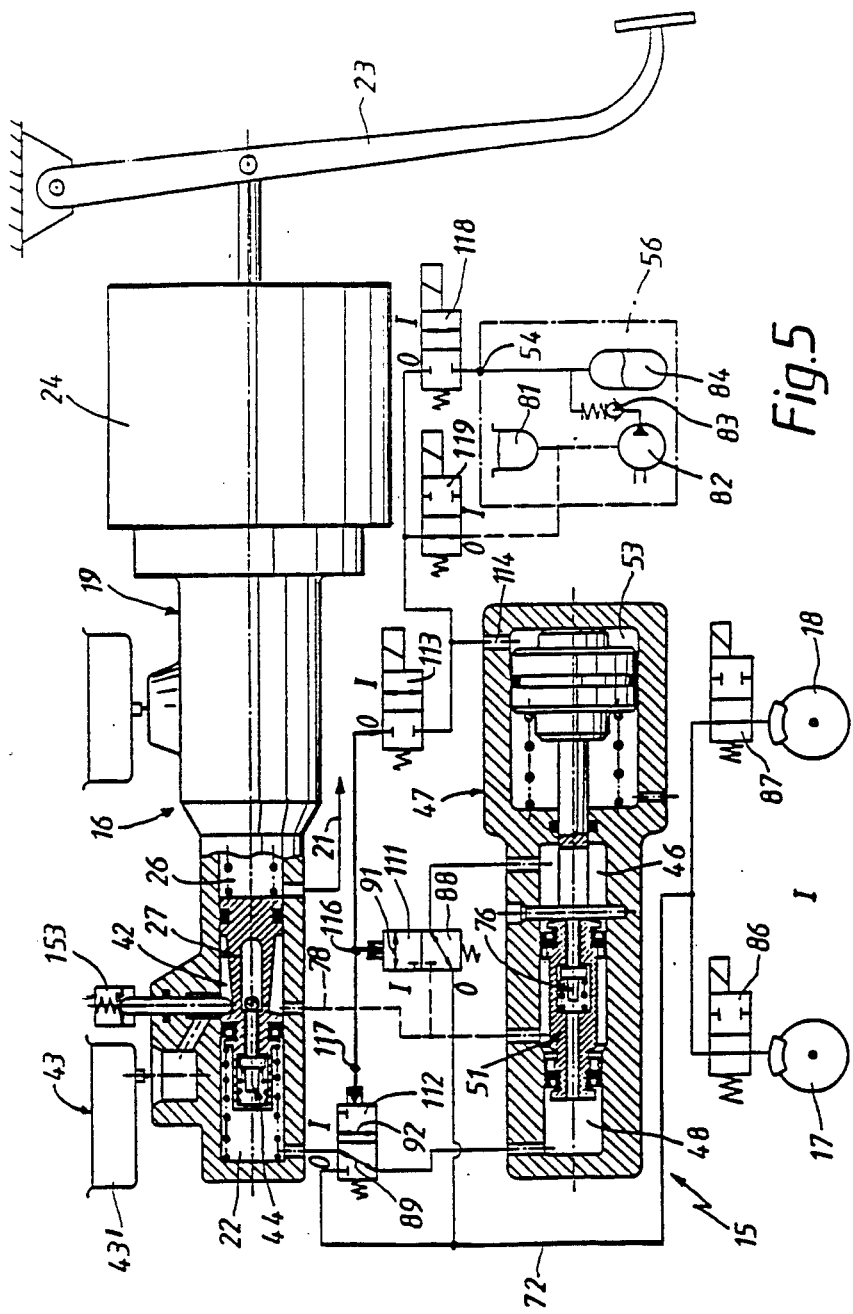

The embodiment according to FIG. 5 is also functionally identical to the embodiment according to FIG. 1 to the extent that the two 3/2-way valves 111 and 112 effect the same hydraulic switching connections in their basic "O" positions, which are assigned to normal braking and to braking subject to an ABS antilocking control, as in their excited "I" positions when the further function control valve 113 is changed into its active "I" through flow position (if at the same time the control system 15 is activated) so that the drive pressure space 53 of the hydraulic cylinder 47 is subjected to the outlet pressure of the auxiliary pressure source 56. This corresponds to the actuation of two 3/2-way solenoid valves 73 and 74 of the function control valve arrangement according to FIG. 1. Accordingly, the through flow paths 88, 91, 89 and 92 are given the same reference numerals as the corresponding through flow paths of the two 3/2-way solenoid valves 73 and 74 of the function control valve arrangement according to FIG. 1.

To this extent, the only difference between the embodiment of FIG. 1 and FIG. 5 is in the hydraulic mechanism used to activate the 3/2-way valves 111 and 112, as opposed to the solenoid activation of 3/2-way valves 73, 74.

However, there is a further structural difference between the embodiment according to FIG. 1 and the embodiment according to FIG. 5. In FIG. 5, the control valve arrangement, utilized for activation of the control system 15, comprises a first 2/2-way solenoid change over valve 118 and a second 2/2-way solenoid change over valve 119. The first change over valve 118 blocks in its basic "O" position and is switched to through flow in its excited "I" position. The second change over valve 119 is open to through flow in its basic "O" position and blocks in its excited "I" position In the basic "O" position of the first change over valve 118, the auxiliary pressure source 56 is blocked from the drive pressure space 53 of the hydraulic cylinder 47. In the basic "O" position of the second change over valve 119, the drive control space 53 of the hydraulic cylinder 47 is connected to the pressureless storage tank 81 of the auxiliary pressure source 56. By excitation of the second change over valve 119 and simultaneous or slightly delayed excitation of the first change over valve 118, the drive pressure space 53 of the hydraulic cylinder 47 is blocked from the storage tank 81 of the auxiliary pressure source 56 and instead is connected to its high-pressure outlet 54. With activation of the two change over valves 118 and 119, the antilocking ABS control mode of the control system 15 is activated. The activation of the control system 15 in the propulsion control ASR mode is achieved by additionally changing over the further control valve 113 into its excited "I" position, as a result of which the two 3/2-way hydraulically activated valves are changed into their excited "I" positions.

During a brake pressure reduction phase of the propulsion ASR control, which requires a switching back of the two control valves 118 and 119 into their respective basic "O" positions, the further change over valve 113 is switched back into its basic "O" blocking position before the two change over valves 118 and 119 are changed over, in order that control pressure in lines 117, 116 of the 3/2-way valves is maintained, so that the hydraulically activated valves are blocked into their excited "I" positions. In order to ensure that the two hydraulically actuated 3/2-way valves 111 and 113 again return to their basic "O" positions for normal braking after completion of a propulsion ASR control cycle, the 2/2-way solenoid function control valve 113 is controlled into its active "I" through flow position for a short period of time after termination of such a propulsion control ASR cycle, so that the control pressure lines 116, 117 of the 3/2-way valves 111 and 112 can expand into the pressureless storage tank 81 of the auxiliary pressure source 56. Thereafter, the further function control valve 113 can be moved back to its basic "O" blocking position. By holding the second change over valve 119, held in its basic "O" position after completion of an ASR control cycle phase, an undesired pressure build-up in the drive pressure space 53 of the hydraulic cylinder 47 due, for example, to a leakage of the first change over valve 118, and/or in the control pressure spaces of the hydraulically controlled 3/2-way valves 111 and 112 which would cause leakage about function control valve 113, cannot occur. This gain in functional reliability can also be utilized in conjunction with the other embodiments of the control system 15 if, instead of a single 3/2-way solenoid valve 79, as shown in FIGS. 1 to 4, as well as FIGS. 9 and 10 (to be referenced later), two 2/2-way solenoid change over valves 118 and 119 are used.

Figure 6:
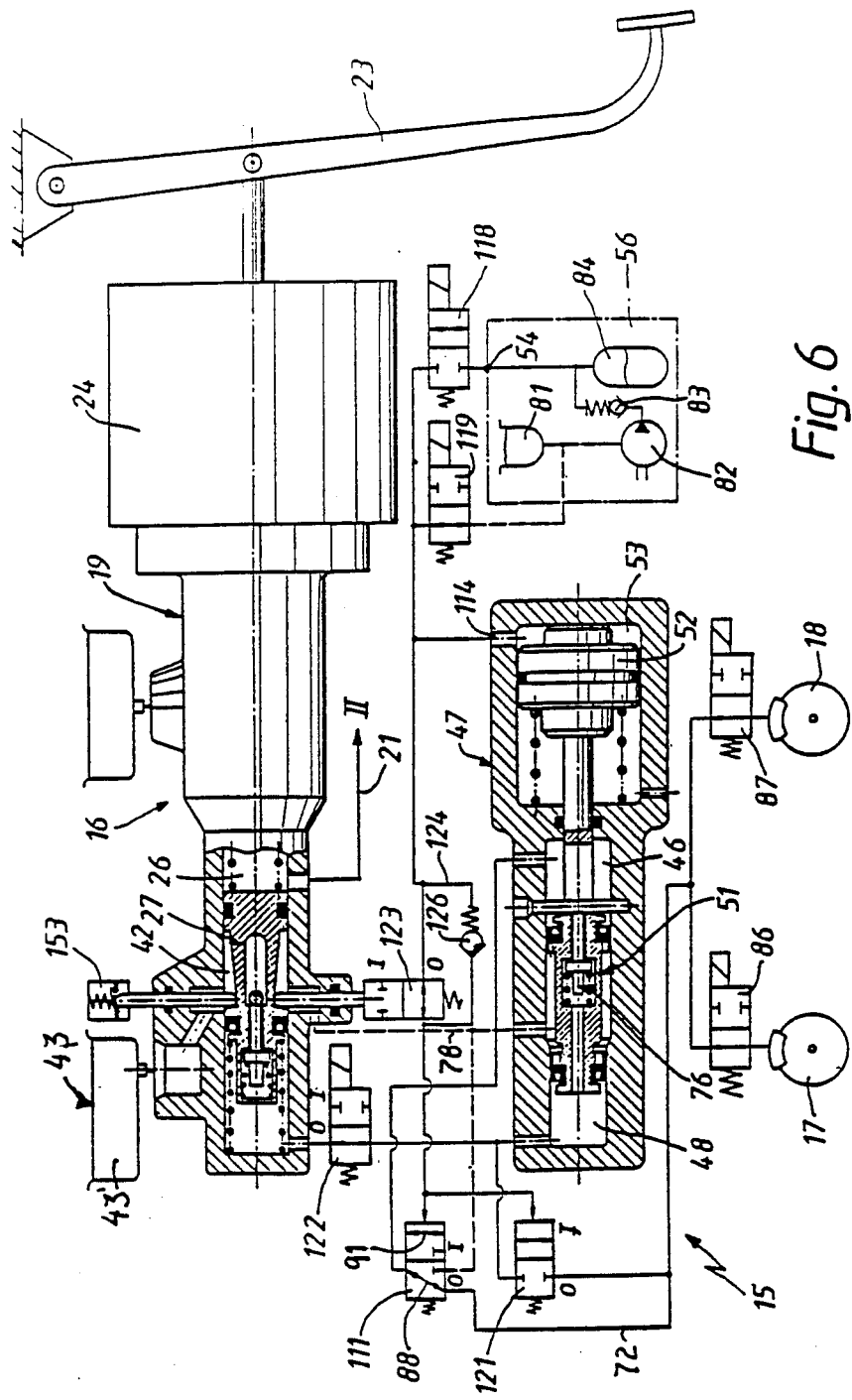

The embodiment in FIG. 6 is similar structurally and in terms of circuitry to that explained with reference to FIG. 5.

In the embodiment according to FIG. 6, two hydraulically activatable function control valve 111 and 121 are switched into their excited "I" positions only when the control system 15 operates in its propulsion control ASR mode. In normal braking or to braking subjected to the antilocking ABS control, the two hydraulically actuated function control valves 111 and 121 remain in their basic "O" positions. In its basic "O" position, 3/2-way valve 111, which corresponds structurally and functionally to the valve 111 of the function control valve arrangement according to FIG. 5, connects the ABS control space 46 of the hydraulic cylinder 47 via the through flow flow path 88, to the main brake line 72 of the rear axle brake circuit I branching off to the wheel brakes 17 and 18, while, in its excited "I" position, it connects the ABS control space 46 to the compensating line 78 and the brake fluid storage tank 43, 43' of the brake system 16 via its through flow path 91.

The second hydraulically activatable function control valve 121 is designed as a 2/2-way valve which, in its basic "O" position, blocks the ASR outlet pressure space 48 of the hydraulic cylinder 47 from the main brake line 72 of the rear axle brake circuit I branching off to the wheel brakes 17 and 18 and, in its excited "I" position, assumed in propulsion ASR control operation, connects the ASR outlet pressure space 48 of the hydraulic cylinder 47 to the main pressure line 72 of the rear axle brake circuit I branching off to the wheel brakes 17 and 18.

The function control valve arrangement further comprises a 2/2-way solenoid control valve 122, which in its basic "O" position assigned to normal brake operation and a brake operation subject to the antilocking ABS control, connects the secondary outlet pressure space 22 of the brake unit 19 to the ASR outlet pressure space 48 of the hydraulic cylinder 47 In its excited "I" position, assigned to the propulsion ASR control mode of the control system 15, this connection is blocked The activation of the control system 15 occurs by feeding outlet pressure of the auxiliary pressure source 56 into the drive pressure space 53 of the hydraulic cylinder 47 which can be controlled by the two change over valves 118 and 119.

A 2/2-way change over pilot control valve 123 for the two hydraulically activatable valves 111 and 121 corresponds functionally to the solenoid control valve 113 of FIG. 5. However, in FIG. 6 it is designed as a valve which is displacement controlled as a function of the working stroke of the secondary piston 27 of the brake unit 19. Once the secondary piston 27 of the brake unit 19 has executed a small initial-portion of its brake pressure build-up stroke, pilot valve 123 transfers from its basic "O" position, in which the drive pressure supply connection 114 of the hydraulic cylinder 47 is connected to the control pressure connections of the two hydraulically activatable valves 111 and 121, into its blocking "I" position which, if subsequently the antilocking ABS control comes into action, the outlet pressure of the auxiliary pressure source 56 can no longer act on the hydraulic control elements of the two hydraulically controllable valves 111 and 121. A one-way valve 126 is connected to a bypass flow path 124 around the pilot control valve 123. This one-way valve 126 opens in response to relatively higher pressure in the control pressure spaces of the two hydraulically activatable valves 111 and 121 than the pressure in the drive pressure space 53 of the hydraulic cylinder 47 or in the pressureless storage tank 81 of the auxiliary pressure source 56.

The purpose of this one-way valve 126 is to make it possible to reduce the control pressure in the control pressure spaces of the hydraulically activatable valves 111 and 121, if the driver actuates the brake system 16 during a propulsion ASR control phase and the pilot valve 123 thereby assumes is blocking "I" position in response to movement of secondary piston 27. Otherwise, it would be impossible to reduce the pressure in the control pressure spaces of the hydraulically activatable valves 111 and 121, with the result that the braking function of this brake circuit would be impaired.

Figure 7:
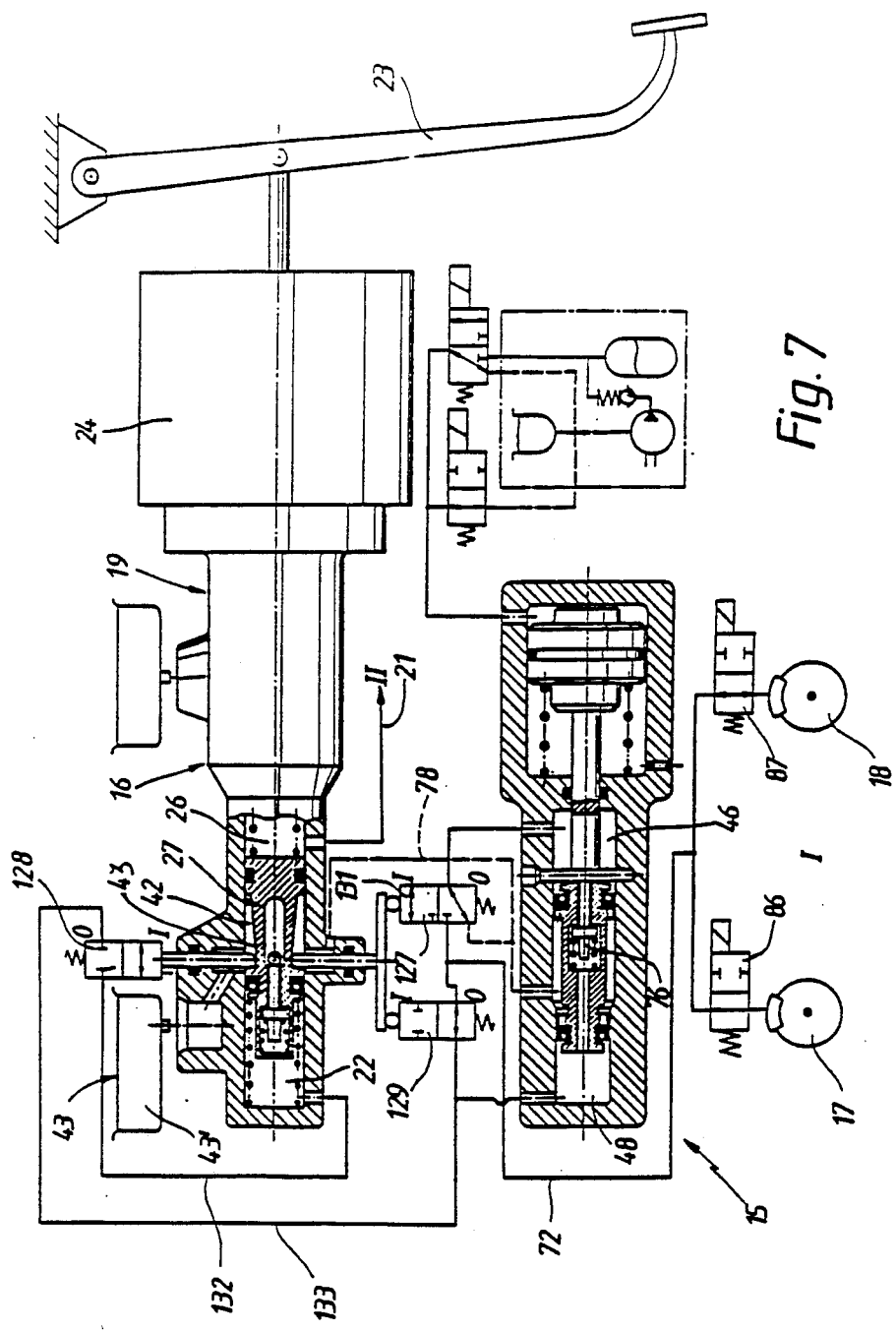

In the embodiment according to FIG. 7, the function control valve arrangement is formed solely by displacement controlled valves 76, 127, 128 and 129, one of which is the central valve 76 of the hydraulic cylinder 47 and accordingly assumes its open position or its blocking position, depending on the position of its piston, while the other function control valves 127, 128 and 129 are designed as valves which respond to the position of the secondary piston 27 of the brake unit 19. As soon as the secondary piston 27 has executed a small initial portion of its brake pressure build-up stroke due to actuation . of the brake system by operator controlled pedal 23, displacement controlled valves 127, 128 and 129 change from their basic "O" positions into their functional excited "I" positions in response to the mechanical drive from the intermediate piston piece 34 of secondary piston 27.

The selection of the control mode by the control system 15 works as a result of coupling of the drive pressure space 53 of the hydraulic cylinder 47 of the high-pressure outlet 54 of the auxiliary pressure source 56 and is therefore purely "mechanical" as a result of the actuation or non-actuation of the brake pedal 23.

A first of the function control valves controlled in this Pedal displacement manner is designed as a 3/2-way valve 127, which in its basic "O" position connects the ABS control space 46 via compensating line 78 and, via the latter, to the brake fluid storage tank 43, 43' of the brake system 16. In the excited "I" position, the ABS control space 46 of the hydraulic cylinder 47 is connected via through flow path 131 to the main brake line 72 of the rear axle brake circuit I. A 2/2-way change over displacement controlled function control valve 128, in its basic "O" position, blocks flow from between secondary outlet pressure space 22 and ASR outlet pressure space 48. In its through flow excited "I" position, line 132, starting from the secondary outlet pressure space 22 of the brake unit 19 of the main brake line of the rear axle brake circuit I is connected to a leading line 133 of the main brake line, which is connected to the ASR outlet pressure space 48 of the hydraulic cylinder 47.

The third correspondingly displacement controlled 2/2-way function control valve 129, when in its basic "O" through flow position, connects leading line 133 and the outlet pressure space 48 of the hydraulic cylinder 47 to the main brake line 72 of the rear axle brake circuit I leading to the wheel brakes of the rear axle brake circuit. In its excited "I" position, function control valve 129 blocks this connection.

Figure 8:
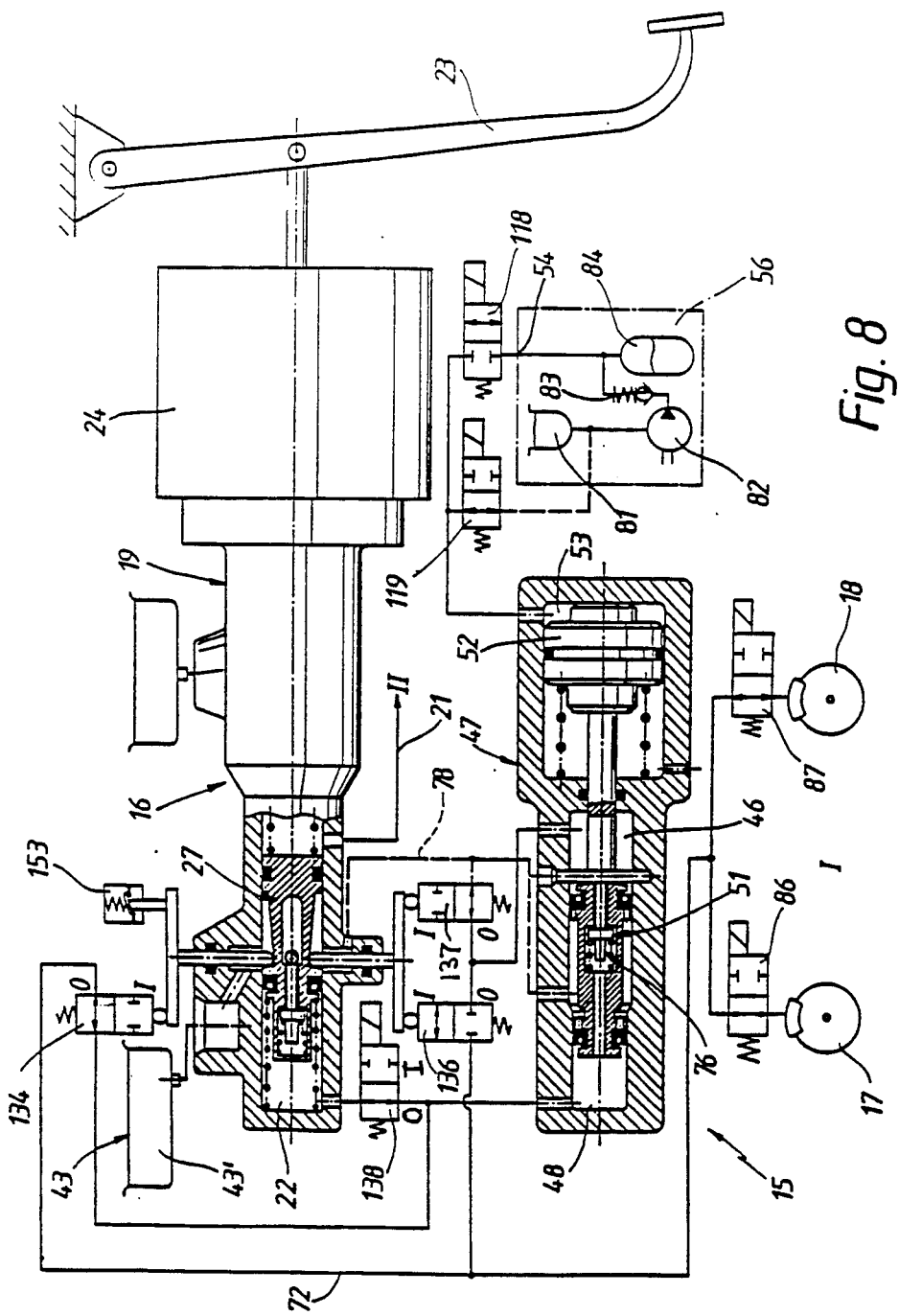

Also in the embodiment according to FIG. 8, the function control valve arrangement comprises, in addition to the central valve 76 of the hydraulic cylinder 47, three further displacement controlled change over valves 134, 136 and 137 which, as long as the brake system 16 is not actuated, assume their basic "O" positions. As soon as the secondary piston 27 of the brake unit 19 has executed a small initial portion of its brake pressure build-up stroke in response to an actuation of the brake system, displacement controlled change over valves 134, 136 and 137 are changed over to their excited "I" functional positions, which are linked to normal braking or to braking subjected to the antilocking ABS control.

Moreover, a fourth 2/2-way solenoid change over valve 138 has a basic "O" position for normal braking and to braking subjected to the antilocking ABS control and an excited "I" blocking position which is assigned to the ASR control mode of the control system 15.

The displacement controlled change over valves 134, 136 and 137 are also designed as 2/2-way valves The first displacement controlled change over valve 134, in its basic "O" position connects the ASR outlet pressure space 48 of the hydraulic cylinder 47 to the main brake line 72 of the rear axle brake circuit I, and in its excited "I" position this first displacement controlled change over valve 134 connection is blocked.

In the basic "O" position of the second displacement controlled change over valve 136, the ABS control space 46 is shut off from the main brake line 72 of the rear axle brake circuit, and in the excited "I" position, the ABS control space 46 is connected to the main brake line 72 branching off to the wheel brakes 17 and 18.

The third displacement controlled change over valve 137, in its basic "O" position, connects the ABS control space 46 to the pressureless brake fluid storage tank 43, 43' of the brake system 16 via compensating line 78, and blocks this connection when in its excited "I" position as a result of an actuation of the brake system 16.

In the basic "O" position of the fourth electrically activatable change over valve 138, the secondary outlet pressure space 22 of the brake unit 19 is connected to the ASR outlet pressure space 48 of the hydraulic cylinder 47, and in the excited "I" position the outlet pressure space 22 is shut off from the ASR outlet pressure space 48.

Instead of having the two displacement controlled change over valves 136 and 137 designed as 2/2-way valves, there can be a change over valve designed as a 3/2-way valve (not shown) and wherein, in the basic "O" position of which the ABS control space 46 is connected to the brake fluid storage tank 43, 43' of the brake system 16 and in the excited "I" position the ABS control space 46 is shut off from the brake fluid storage tank 43, 43', and instead is connected to the the main brake line 72 of the static rear axle brake circuit I.

Figure 9:
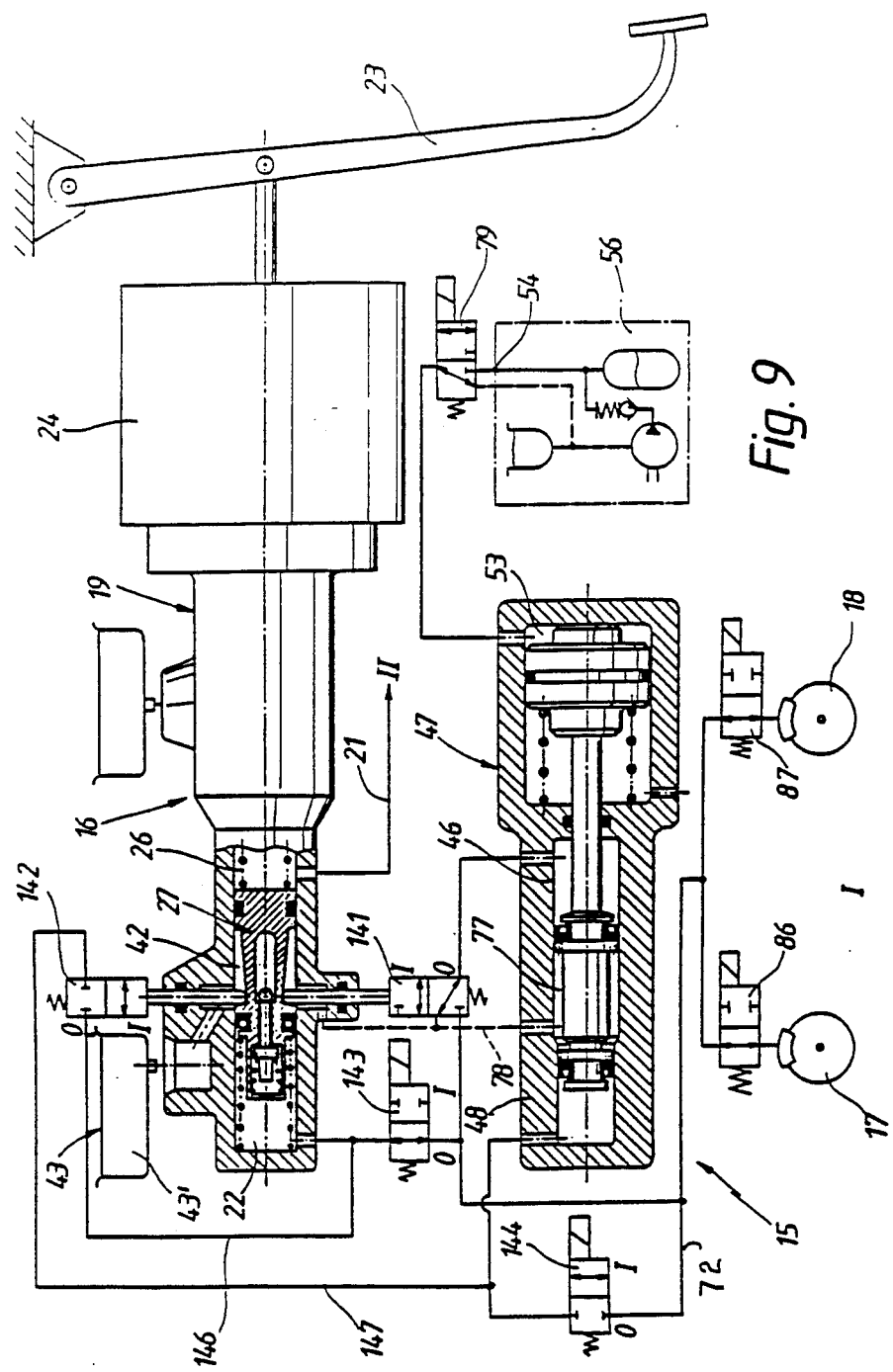
FIGS. 9 to 11 show, in a representation corresponding to that of FIG. 1, further exemplary embodiments of the antilocking ABS and propulsion ASR control system according to the invention, with a design, alternative to FIGS. 1 to 8, of a hydraulic cylinder used as a brake pressure regulating member and of the function control valve arrangement.
Figure 10:
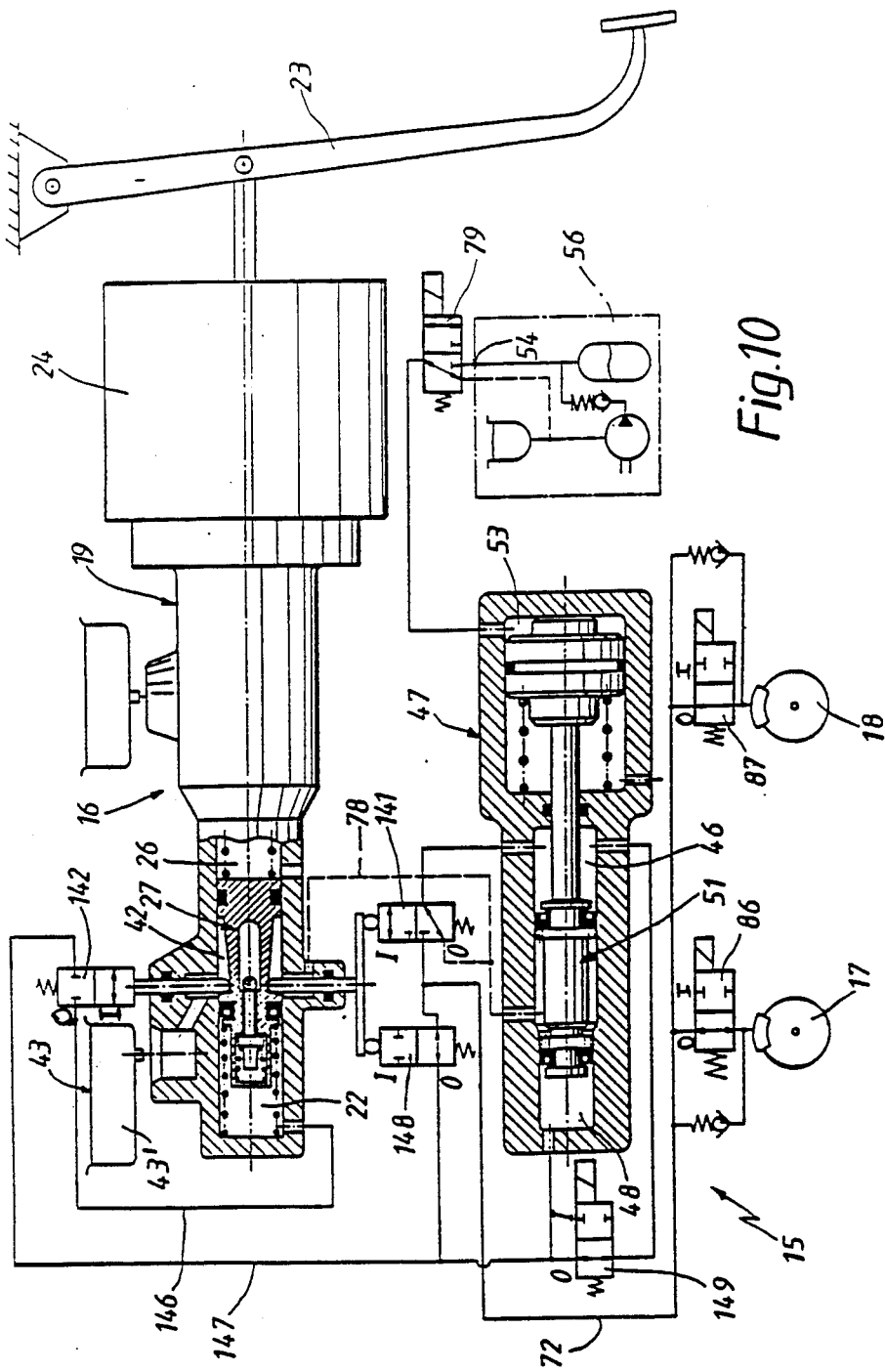
Figure 11:
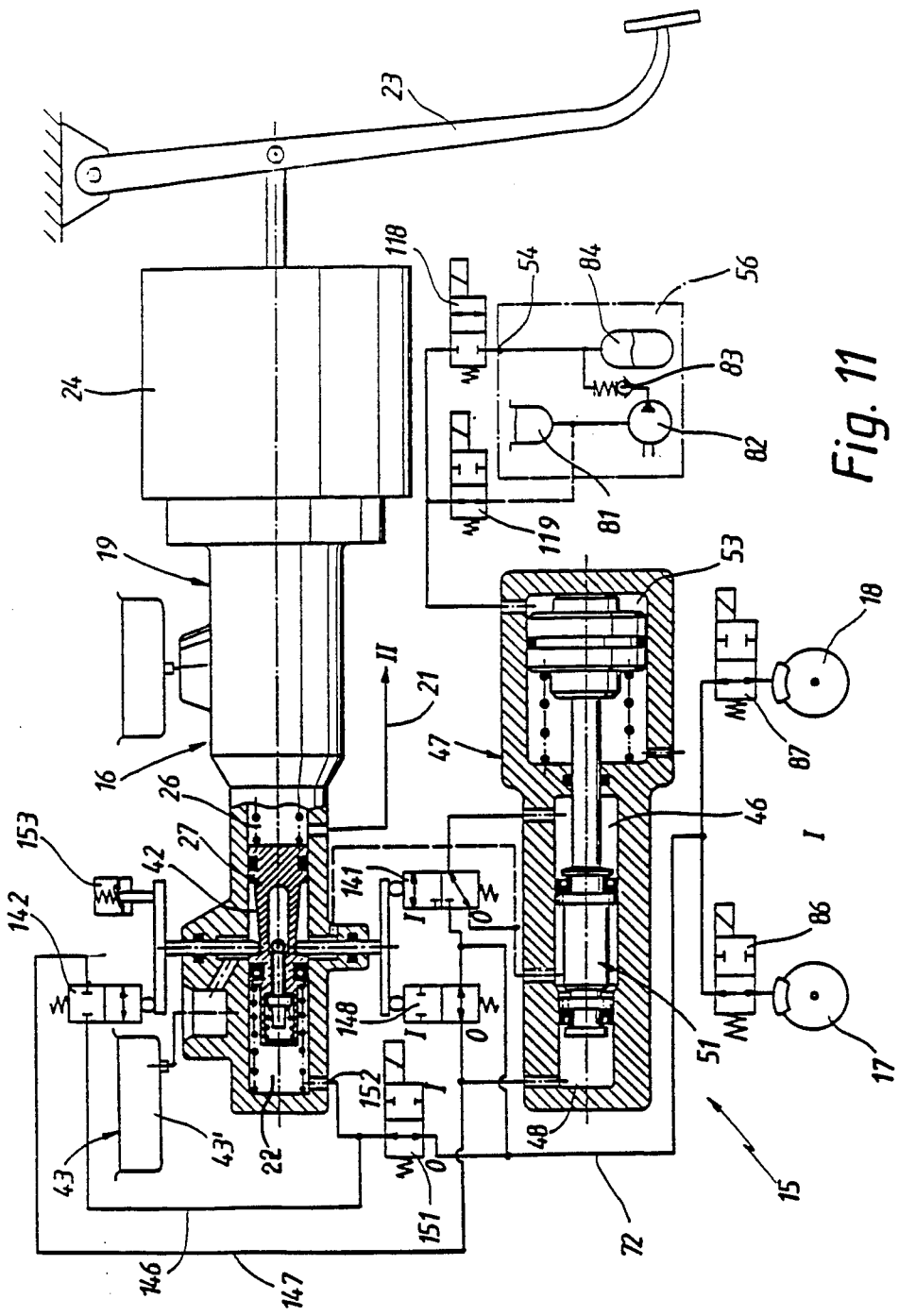

In each of the exemplary embodiments explained with reference to FIGS. 1 to 8, one valve element of the function control valve arrangement is designed as a central valve 76 integrated in the hydraulic cylinder 47 provided as a brake pressure regulating member. FIGS. 9 to 11 relate to the function control valve arrangements without a central valve 76 in the aforementioned hydraulic cylinder 47.

The function control valve arrangement provided in FIG. 9 is composed in a similar way to those embodiments explained above, and utilizes mechanically displaceable controlled valves 141 and 142 and electrically activatable solenoid valves 143 and 144 which, in response to an activation of the control system 15, without taking into consideration the physical connection of the drive pressure space 53 of the hydraulic cylinder 47 to the high-pressure outlet 54 of the auxiliary pressure source 56, make the appropriate selection of an antilocking ABS or propulsion ASR control mode.

The two mechanically controlled valves 141 and 142 are designed so that they assume their basic "O" positions when and for as long as the brake system 16 is not actuated by the driver, and are changed over to their excited "I" positions when the brake system 16 is actuated by the driver through pedal 23 and the secondary piston 27 of the brake unit 19 has accordingly executed a small initial portion of its brake pressure build-up stroke. The basic "O" positions of these two mechanically displaceable controlled valves 141 and 142 relate to the propulsion control ASR mode of the control system 15 and their excited "I" positions relate to normal braking or to braking in which the control system 15 is activated in its antilocking ABS control mode.

A 3/2-way displacement controlled valve 141, in its basic "O" position connects the ABS control space 46 of the hydraulic cylinder 47 to the compensating line 78, connecting the compensating space 77 of hydraulic cylinder 47 to the follow-up space 42 of the brake unit 19, and consequently to the brake fluid storage tank 43, 43' of the brake system 16. In the excited "I" position, the ABS control space 46 is connected to the main brake line 72 of the rear axle brake circuit I.

The second displacement controlled change over valve 142 is designed as a 2/2-way valve and when in its basic "O" blocking position, blocks line 146 leading from the secondary outlet pressure space 22 of the brake unit 19 to the main brake line 72 of the rear axle brake circuit I via line portion 147 and function control valve 144. This line portion 147 of the main brake line 72 is connected permanently to the ASR outlet pressure space 48 of the hydraulic cylinder 47 In the excited "I" position of displacement controlled valve 142, assumed when the brake system 16 is actuated, the secondary outlet pressure space 22 of the brake unit 19 is connected to the ASR outlet pressure space 48 of the hydraulic cylinder 47

The first solenoid valve 143, in its basic "O" Position, connects the secondary outlet pressure space 22 of the brake unit to the main brake line 72 of the rear axle brake circuit I and is changed over to its excited "I" blocking position when the control system 15 is activated either in its antilocking control ABS mode or in its propulsion control ASR mode.

The second 2/2-way solenoid valve 144 is inserted between the line portion 147 and the main brake line 72. In its basic "O" blocking position, brake line portion 147 and main line 72 are shut off from one another. In normal braking and in braking subjected to the antilocking ABS control, solenoid valve 144 is maintained in its basic "O" position, and only when the control system 15 is activated to its propulsion control ASR mode is valve 144 changed over to its excited "I" through flow position where the ASR outlet pressure space 48 is connected to the main brake line 72 of the rear axle brake circuit I.

Instead of the solenoid valve 143 which is inserted between the secondary outlet pressure space 22 and and the main brake line 72 branching off to the wheel brakes 17 and 18 and which is moved into its excited "I" position whenever the control system 15 is activated, there can be a hydraulically activated valve (not shown) of corresponding function, which, together with the drive pressure space 53 of the hydraulic cylinder 47, is subjected to a control actuation pressure when the control system 15 is actuated.

In the embodiment according to FIG. 10, the function control valve arrangement comprises two mechanically displaceable controlled valves 141 and 142 which correspond in constructional and functional terms to the valves bearing the same functional symbols in the embodiment according to FIG. 9.

Furthermore, the function control valve arrangement comprises a third mechanically displaceable controlled valve 148 which, together with the other two, can be moved out of its basic "O" position in which the line portion 147 is connected to the main brake line 72 of the rear axle brake circuit 1 into its excited "I" blocking position, in which the connection between line portion 147 and the main brake line 72 is broken.

A fourth 2/2-way solenoid function control valve 149, in its basic "O" position connects the line portion 147 to the main brake line via ABS control space 46 and mechanically displaceable control valve 141 and also connects the ASR outlet pressure space 48 of the hydraulic cylinder 47 to the ABS control space 46. In the excited "I" position these connections are broken. This 2/2-way solenoid function controlled valve 149 assumes its basic "O" position during normal braking only and is changed over to its excited "I" blocking position, both for the antilocking ABS mode and for the propulsion control ASR mode of the control system 15.

Here too, instead of the electrically activated valve 149 there could be a hydraulically activated valve (not shown) which could be activated by the outlet pressure of the auxiliary pressure source 56.

During normal braking, the pressure built up in the secondary outlet pressure space 22 of the brake unit 19 is also fed, via the line portion 147 of the main brake line of the rear axle brake circuit I, into the ASR outlet pressure space 48 and, via the solenoid valve 149 which, in this operation state of the brake system 16, is in its basic "O" through flow position, into the ABS control space 46 of the hydraulic cylinder 47. In this operating state of the brake system 16, the displacement controlled valve 141 designed as a 3/2-way valve and in its excited "I" position connects the ABS control space 46 to the main brake line 72 of the rear axle brake circuit I.

The solenoid valve 149 according to FIG. 10 acts as a function control valve arrangement in terms of its function, insofar as during normal braking it makes the connection between the ASR outlet pressure space 48 and the ABS control space 46 in a manner similar to the central valves 76 provided in the embodiments according to FIGS. 1 to 8.

When the control system 15 works in the antilocking ABS control mode with the drive pressure space 53 of the hydraulic cylinder 47 connected to the high-pressure outlet 54 of the auxiliary pressure source 56 via the pressure supply control valve 79 and the 2/2-way solenoid valve 149 moved to its excited "I" blocking position, while the displacement controlled valves 141, 142 and 148 are moved into their excited "I" positions. Thus, the ABS control space 46 of the hydraulic cylinder 47 is connected only via the 3/2-way valve 141 to the main brake line 72 of the rear axle brake circuit I, while the ASR outlet pressure space 48 is connected to the secondary outlet pressure space 22 of the brake unit 19 via the displacement controlled 2/2-way valve 142 which is in its excited "I" open position. During the time when during a pressure reduction regulating movement of the regulating piston 51 of the hydraulic cylinder 47 takes place in the direction of an increase of the ABS control space 46, brake fluid overflows from the wheel brake 17 and/or 18 subjected to a pressure reduction phase into the ABS control space 46, and a corresponding quantity of brake fluid is forced out of the ASR outlet pressure space 48 of the hydraulic cylinder 47 back into the secondary outlet pressure space 22 of the brake unit 19. As a result, the secondary piston 27 of the latter is pushed back towards its basic position, to provide a corresponding backward movement of the brake pedal 23, thus giving the driver appropriate notification of the activation of the antilocking ABS control.

When the control system 15 is activated in the propulsion control ASR mode, the drive pressure space 53 is once again connected to the high-pressure outlet 54 of the auxiliary pressure source 56 and the 2/2-way solenoid valve 149 of the function control valve arrangement is moved into its blocking "I" position while the displacement controlled valves 141, 142 and 148 assume their basic "O" positions. Then only the ASR outlet pressure space 48 of the hydraulic cylinder 47 is connected to the the main brake line 72 of the rear axle brake circuit I via the displacement controlled 2/2-way valve 148 located in its basic "O" position. The ASR outlet pressure space 48 is shut off from the ABS control space 46 by displacement valve 141 and instead is connected to the compensating line 78 and to the brake fluid storage tank 43, 43' of the brake system 16, by the displacement controlled 3/2-way valve 141 located in its basic "O" position. The secondary outlet pressure space 22 of the brake unit 19 is shut off from the wheel brakes 17 and 18 because the displacement controlled valve 142 is in its basic "O" blocking position.

The brake pressure build-up and brake pressure reduction phases of the propulsion ASR control are controlled by coupling and uncoupling the drive pressure space 53 of the hydraulic cylinder 47 respectively to and from the auxiliary pressure source 56. Brake pressure holding phases are controlled by changing over the respective brake pressure regulating valve 86 and/or 87 from the basic "O" position to the excited "I" blocking position.

Also in the alternative embodiment illustrated in Figure 11, the function control valve arrangement comprises three mechanically displaceable controlled change over valves 141, 142 and 148 and a fourth 2/2-way solenoid change over valve 151.

The mechanically displaceable controlled valves 141, 142 and 148 correspond in constructional and functional terms to the valves bearing the same reference symbols in FIG. 10. The only difference from the embodiment according to FIG. 10 is the insertion of the 2/2-way solenoid valve 151 into the hydraulic circuit arrangement.

The 2/2-way solenoid valve 151 is inserted between the pressure outlet 152 of the secondary outlet pressure space 22 of the brake unit 19 and the main brake line 72 of the rear axle brake circuit I. When the 2/2-way solenoid valve 151 is in the basic "O" position, assigned to normal braking, the secondary outlet pressure space 22 of the brake unit 19 is thus connected directly to the main brake line 72. The 2/2-way solenoid valve 151 is moved into its blocking "I" position both when the control system 15 works in the antilocking ABS control mode and when it is activated in the propulsion ASR control mode.

Instead of the solenoid valve 151 there could be a hydraulically activated 2/2-way valve (not shown) which is moved out of its open through flow position into a blocking position when the control system 15 is activated by connecting the drive pressure space 53 of the hydraulic cylinder 47 to the pressure at the auxiliary pressure source 56.

In the embodiments of the control system 15 according to the invention which are illustrated in FIGS. 1, 3–6 and 8, the brake unit 19 is equipped with a position indicator 153 generating a electrical output signal which differs characteristically, depending on whether the secondary piston 27 of the brake unit is in the immediate vicinity of or in its particular basic "O" position, or if it is shifted out of this position by more than a small initial portion of its possible working stroke.

In these embodiments, the electrical output signal, characteristic of the position of the secondary piston 27 of the brake unit 19 after a response of the antilocking control, is used to terminate the connection of the drive pressure space 53 of the hydraulic cylinder 47 to the output pressure of the auxiliary pressure source 56 by changing over the pressure supply/control valve arrangements 79 and 118, 119 to their basic "O" positions. This prevents more brake fluid than is required by the antilocking ABS control from being forced out of the ASR outlet pressure space 48 of the hydraulic cylinder 47 towards the brake unit 19 or to its brake fluid storage tank 43, 43'.

Without the position indicator 153, a malfunction of this kind would be possible if the antilocking ABS control were to respond in the part braking range, that is to say in a braking situation in which the secondary piston 27 of the brake unit 19 has been displaced by the amount of only part of its possible pressure build-up stroke, but as a result of the antilocking control, the regulating piston 51 of the hydraulic cylinder 47 reaches its end position related to a minimum volume of the ASR outlet pressure space 48. Under such a condition, much more brake fluid than would be necessary for the antilocking ABS control would be conveyed out of the ASR outlet pressure space 48 back into the secondary outlet pressure space 22 of the brake unit 19 and, as soon as the secondary piston 27 of the latter has assumed its basic position, back into the brake fluid storage tank 43, 43' via the then opened central valve 44.

If, in this case, a response of the control system 15 in its propulsion ASR control mode were to become necessary immediately after the end of the antilocking ABS control cycle, i.e., even before the regulating piston 51 of the hydraulic cylinder 47 could assume its basic position, the propulsion ASR control could take effect at most only to a restricted degree, if at all, since in this case the volume of brake fluid which can be forced out of the ASR outlet pressure space 48 into the wheel brake 17 and/or 18 would no longer be sufficient to build up the necessary brake pressure. This malfunction can be effectively prevented by the position indicator output signal from 153 as explained above.

Figure 12:
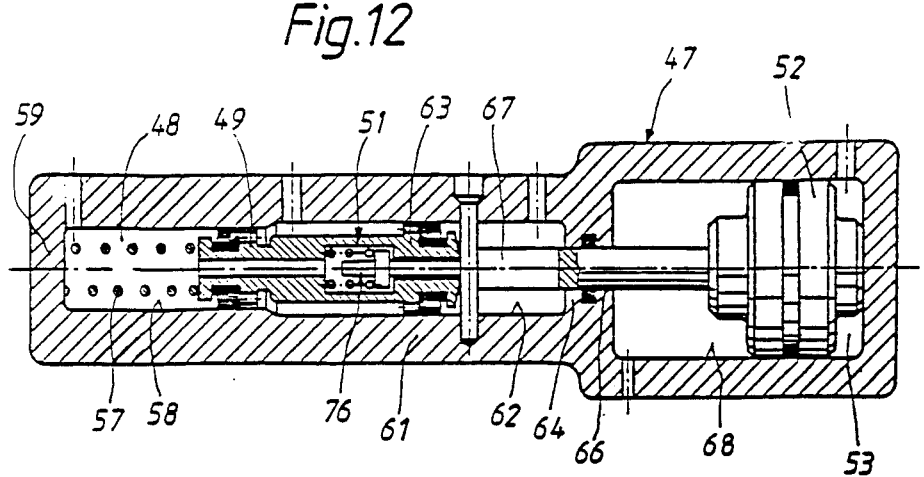
FIG. 12 shows, in longitudinal section, an alternative hydraulic cylinder which can be used in the exemplary embodiments according to FIGS. 1 to 8 instead of the hydraulic cylinder provided therein.

FIG. 12 shows an alternative version of the hydraulic cylinder 47 which can be used within the control system 15 according to the invention and which, in the exemplary embodiments according to FIGS. 1 to 8, can take the place of hydraulic cylinder 47. It differs from that shown in FIGS. 1-8 only in that the regulating piston 51 and the drive piston 52 are designed as separate piston elements, and the restoring spring 57, which forces both the regulating piston 51 and the drive piston 52 into the basic position shown, is now arranged within the ASR outlet pressure space 48 of the hydraulic cylinder 47. The spring 57 is supported between the end wall 59 of the cylinder housing 61 and the diametrically smaller flange 49 of the regulating piston 51. An extension 67 in the form of a piston rod, which is guided displaceably in a pressure tight manner through the central bore 66 of the intermediate wall 64 of the cylinder housing 61, on the side of the drive piston 52 facing the intermediate wall 64, is not connected firmly to the drive piston 52. In this design of the hydraulic cylinder 47, an exact centering of the bore steps 58 and 62, in which the flanges 49 and 63 of the regulating piston 51 are displaceably guided in a pressure tight manner relative to the housing bore 68 and in which the drive piston 52 is displaceably guided in a pressure tight manner, is not necessary, and this can be of considerable advantage in terms of production.

Also in the alternative version of FIG. 12, the hydraulic cylinder 47 used as a brake pressure regulating member within the control system according to the invention can, in the embodiments of FIGS. 1 to 8, take the place of the hydraulic cylinder 47 shown therein, while utilizing the same circuit peripherals, i.e., the same design and layout of the function control valve arrangement and the drive pressure supply.

Figure 13:
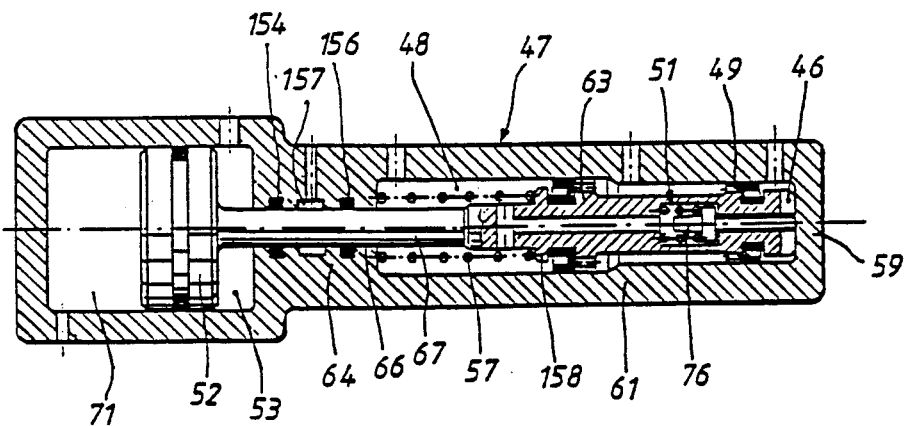
FIG. 13 shows a further design of a hydraulic cylinder which can be used with the framework of the exemplary embodiments according to FIGS. 1 to 8, otherwise in a longitudinal sectional representation corresponding to that of FIG. 12.

According to FIG. 13, an annular drive pressure space 53 is defined relative to the housing 61 by the fixed intermediate wall 64 and the movable larger step of the drive piston 52. This annular drive pressure space is used as the ASR outlet pressure space 48, and the functional space, limited movably in the axial direction by the smaller piston step 49 of the regulating piston and fixedly relative to the housing by the end wall 59 of the cylinder housing 61, is used as an ABS control space 46.

The drive piston 52 is once again connected firmly, via a piston rod 67 sealed off from the housing 61 within the axial bore 66 through which the intermediate wall 64 extends, by two annular gaskets 154 and 156, between which is arranged a pressureless leakage oil space 157 provided for media separation between the drive circuit and the control circuit.

Here, the restoring spring 57 forcing the composite piston structure 51, 52 into its illustrated basic position, related to a minimum volume of the ABS control space 46 and a maximum volume of the ASR outlet pressure space 48, is arranged within the ASR outlet pressure space of the hydraulic cylinder 47 and it is supported between fixed intermediate wall 64 and supporting flange 158 of piston 51.

Here, the central valve 76 making the communicating connection between the ABS control space 46 and the ASR outlet pressure space 48 in the basic position of the composite piston structure 51, 52 is maintained in its open position as a result of the support of its valve tappet against the end wall 59 of the cylinder housing.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A breaking control system for a road vehicle, providing for:
   normal braking, as well as antilocking ABS and propulsion braking control ASR and having hydraulic multi-circuit brake systems, in which brakes on driven vehicle wheels form a part of a static brake circuit which is connected via a brake pressure valve or valves by a main brake line to an outlet pressure space of a brake unit actuable by a pedal;
   an antilocking ABS brake system means controlling actuating brake pressure reduction and build-up phases at said brakes by respectively increasing or decreasing an ABS control space volume, which space is connected to the brakes of the driven wheels;
   a propulsion ASR system means controlling deceleration of a driven vehicle wheel tending to spin by activating its wheel brake until drive slip of the driven vehicle wheel remains within a range of values compatible both with good propulsion acceleration and with good driving stability;
   wherein there is provided an activatable brake pressure regulating valve means for controlling pressure reduction, pressure build-up and pressure holding phases of both the antilocking ABS control and the propulsion ASR control, which is movable out of a through flow position relating to the pressure reduction and pressure build-up phases of the antilocking ABS control and to normal braking not subjected to antilocking control, into a blocking position, related to brake pressure holding phases on the respective wheel brake;
   a hydraulic cylinder means having a displaceable piston means for as a pressure build-up and pressure reduction regulating of the antilocking ABS control;
   a drive pressure space alternatively connectable by said activatable brake pressure regulating valve means to an outlet pressure of an auxiliary pressure source and to a pressureless tank;
   said piston means being displaceable between end positions by pressure in said drive pressure space to define with said hydraulic cylinder, minimum and maximum volumes of an ABS control space which, during normal braking and in pressure reduction and pressure build-up phases of the antilocking ABS control, is connected by said activatable brake pressure regulating valve means with at least one of the wheel brake or wheel brakes of the static brake circuit;
   said hydraulic cylinder means having an ASR outlet pressure space as a pressure build-up and pressure reduction regulating means of the propulsion ASR control, which is connectable by said activatable brake pressure regulating valve means to the outlet pressure space of the brake unit and to the brake circuit of the driven vehicle wheels;
   the ASR outlet space having a variable area being defined by said hydraulic cylinder means and by a piston means of said hydraulic cylinder means being displaceable in the direction of a brake pressure build-up when said drive pressure space is connected to the outlet pressure of the auxiliary pressure source and to a pressure reduction when drive pressure space is connected to a non-pressure source;

ABS and ASR function control valve means, which connects in the sequence, connects the drive pressure space with said non-pressure source and with said pressure outlet of the auxiliary pressure source for providing pressure reduction and pressure build-up at the wheel brakes for respective control phases of the antilocking ABS and propulsion ASR control, the improvement comprising:

that said hydraulic cylinder and piston means includes at least one hydraulic cylinder which is designed as a step cylinder;

a movable regulating piston which has two piston flanges of differing diameter;

one piston flange cooperating with the step cylinder to define said ASR outlet pressure space;

movable drive piston means for moving the regulating piston to decrease in volume the ASR outlet pressure space and build up the brake pressure in said at least one wheel brake;

the other of said piston flanges cooperating with the step cylinder to define said ABS control space;

said drive piston means moving the regulating piston to increase in volume the ABS control space and reduce the brake pressure in the at least one wheel brake;

the regulating piston being coupled via a piston rod passing displaceably in a pressure tight manner through an intermediate wall of the cylinder housing to said drive piston means;

said drive piston means with said hydraulic cylinder movably defines the drive pressure space;

connection means for connecting said output pressure of said auxiliary pressure source to said drive pressure space to build up the pressure therein and to connect said drive pressure space to said non-pressure source to relieve the pressure therein;

the drive piston means being responsive to increased pressure in said drive pressure space to move the regulating piston in a direction to increase the ABS control space and decrease the ASR outlet-pressure space and, in response to said release of pressure in said drive pressure space, to move the regulating piston in a direction to decrease the ABS control space and increase the ASR outlet-pressure space, the drive piston means being biased by a restoring spring into a basic position corresponding to the minimum volume of the ABS control space; and wherein:

the regulating control valve means performs the following functions:

in normal braking not subjected to the antilocking ABS control, the regulating control valve means connects all three of the outlet pressure space of the brake unit, the ASR outlet pressure space, and the ABS control space of the hydraulic cylinder to the main brake line of the brake circuit leading to the wheel brakes;

in braking by the antilocking ABS control, the regulating control valve means connects only the ABS control space to the main brake line of the brake circuit and connects the ASR outlet pressure space to the outlet pressure space of the brake unit;

in braking by the propulsion ASR control, the regulating control valve means cuts off the connection of the outlet pressure space of the brake unit to the main brake line of wheel brakes, while connecting the ABS control space to a non-pressure brake fluid storage tank and the ASR outlet pressure space to the brake line leading to the wheel brakes.

2. Control system according to claim 1, wherein the drive pressure space is defined by an intermediate wall of the cylinder and by the drive piston means in the hydraulic cylinder;

wherein the ASR outlet pressure space is defined by the larger piston step of the regulating piston and said intermediate wall;

wherein the ABS control space is defined by the smaller piston step of the regulating piston and an end wall of the cylinder housing; and wherein the regulating piston and the drive piston are connected firmly to one another.

3. Control system according to claim 1, wherein the ASR outlet pressure space is defined by the smaller diameter piston flange of the regulating piston of the hydraulic cylinder and by an end wall of the cylinder housing;

wherein the ABS control space is defined by the larger diameter piston flange of the regulating piston and an intermediate wall of the cylinder housing;

a piston rod coupling the drive piston with the regulating piston and passing through a central bore in said intermediate wall; and wherein the drive pressure space is defined by another end wall of the cylinder housing and the drive piston 4. Control system according to claim 3, wherein the drive piston and the regulating piston are separate piston elements;

the regulating piston is supported axially on the drive piston by a rod-shaped extension of the piston rod, guided displaceably in a pressure tight manner through said central bore in said intermediate wall of the cylinder housing;

a restoring spring means for biasing the regulating piston and the drive piston into a basic position; and wherein said restoring spring means engages the regulating piston.

5. Control system according to claim 3, wherein an effective amount of a flange surface of the larger flange of the regulating piston, defining the ABS control space, and an effective area of flange surface of the smaller flange of the regulating piston, defining the ASR outlet pressure space of the hydraulic cylinder are approximately of equal size within a range of variation of ±15%.

6. Control system according to claim 1, wherein in the non-activated state of the control system, the ASR and ABS function control valve means provide a hydraulic series connection between the outlet pressure space of the brake unit, the ASR outlet pressure space of the hydraulic cylinder the ABS control space and the at least one brake line leading on to the wheel brakes; and wherein there is a control valve means which, when the respective control (ABS or ASR) is initiated, is changed from a through flow position providing the series connection between the ASR outlet pressure space and the ABS control space to a position blocking the connection between the ASR outlet pressure space and the ABS control space.

7. Control system according to claim 6, wherein the control valve is actuable mechanically by displacement of the regulating piston of the hydraulic cylinder.

8. Control system according to claim 7, wherein the mechanically actuable control valve is a central valve located in the regulating piston of the hydraulic cylinder;
- wherein said central valve is in an open position in a basic position of the regulating piston, corresponding to the non-activated state of the control system;
- and wherein said central valve is maintained in its open position until the regulating piston has been displaced a small initial portion of its functional stroke, whereupon the central valve assumes its closed position.

9. Control system according to claim 6, wherein the function control valve means comprise a control valve which can be moved out of a basic position, which is assigned to normal braking and to the antilocking ABS control mode; and in which it connects the outlet pressure space of the brake unit to the ASR outlet pressure space of the hydraulic cylinder, into an excited through flow position, in which the ASR outlet pressure space of the hydraulic cylinder is connected to the at least one wheel brake via the brake pressure regulating valve or regulating valves and the outlet pressure space of the brake unit is shut off from the ASR outlet pressure space;
- a second function control valve means movable from a basic position, which corresponds to normal braking and to the antilocking control mode and in which the ABS control space is connected to the wheel brakes of the brake circuit, via the brake pressure regulating valve, to an excited position provided for the ASR control mode and in which the ABS control space is connected with a brake fluid storage tank of the brake system and shut off from the brake circuit;
- said two function control valve means being 3/2-way solenoid valves receiving output signals from an electronic control unit of the control system for movement into the basic or excited positions necessary for the particular control mode.

10. Control system according to claim 6, wherein said pedal operates on a brake piston to produce a brake pressure in said outlet pressure space;
- said function control valve means comprising two mechanically displacable controlled valves which, after a small fraction of a brake pressure build-up stroke of the brake piston which reduces the outlet pressure space of the brake unit, are moved out of their basic positions into their excited functional positions;
- one of these two valves designed as a 2/2-way valve which in its basic position blocks a flow path leading from the outlet of the ASR outlet pressure space of the hydraulic cylinder to the outlet pressure space of the brake unit and in its excited position opens said flow path;
- the other of the two mechanically displaceable controlled valve being designed as 3/2-way valve, which in its basic position provides communication of the ABS control space with the brake circuit, and in its excited position blocks that communication and provides communication between the ABS control space and a brake fluid storage tank;
- a third 2/2-way solenoid control valve, which in its basic position shuts off a connection of the ASR outlet pressure space from the main brake line of the brake circuit;
- said third valve being moved to an excited position by an ASR function control signal, wherein the ASR outlet pressure space of the hydraulic cylinder is connected to the main brake line portion leading to the at least one wheel brake.

11. Control system according to claim 6, wherein said pedal operates on a brake piston to produce a brake pressure in said outlet pressure space;
- said function control valve means comprises a 3/2-way displacement control valve which, after a small fraction of a pressure build-up stroke of the brake piston reducing the outlet pressure space of the brake unit, is moved out of its basic position, in which it connects the ABS control space of the hydraulic cylinder to a brake fluid storage tank of the brake system and shuts off the ABS control space from the brake circuit of the vehicle wheels into its excited position in which the ABS control space is connected to brake circuit and is shut off from the brake fluid storage tank;
- and in that the control valve means also comprises an electrically actuated 3/2-way solenoid control valve which, by an output signal coming from the electronic control unit of the control system in its propulsion ASR control mode, is moved out of its basic normal braking or braking subjected to the antilocking control position in which the outlet pressure space of the brake unit and the ASR outlet pressure space of the hydraulic cylinder are connected to one another, into its excited position, in which only the ASR outlet pressure space of the hydraulic cylinder is connected to the brake circuit of the controllable vehicle wheels and the outlet pressure space of the brake unit is shut off from this brake circuit.

12. Control system according to claim 10, wherein a one-way valve is inserted between the ASR outlet pressure space of the hydraulic cylinder and the main brake line of the brake circuit-in parallel with the third solenoid control valve wherein said one-way valve can open as a result of a higher pressure in the main brake line than in the ASR outlet pressure space of the hydraulic cylinder to permit flow from the main brake line into the ASR outlet pressure space.

13. Control system according to claim 6, wherein said pedal operates on a brake piston to produce a brake pressure in said outlet pressure space;
- said function control valve means comprises a 3/2-way displacement control valve which, after a small fraction of a pressure build-up stroke of the brake piston reducing the outlet pressure space of the brake unit, is moved out of its basic position, in which it connects the ABS control space of the hydraulic cylinder to the brake fluid storage tank of the brake system and shuts off the ABS control space from the brake circuit of the vehicle wheels, into its excited position in which the ABS control space is connected to the brake line of the controllable brake circuit and is shut off from the brake fluid storage tank;
- a first 2/2-way solenoid control valve which is moved out of its basic normal braking or braking subjected to the antilocking ABS control position by the control system in the propulsion control mode;

the first solenoid control valve in its basic position connecting the outlet pressure space of the brake unit to the ASR outlet pressure space of the hydraulic cylinder and in its excited position braking this connection;

a second 2/2-way solenoid control valve which is moved out of its basic normal braking or propulsion ASR control position by a control signal linked to an activation of the control system in its antilocking control mode the ASR outlet pressure space of the hydraulic cylinder directly to the brake line of the brake circuit and in its excited blocking position closing off said connection.

14. Control system according to claim 6, wherein said function control valve means comprises two jointly hydraulically activatable valves which, in their basic normal braking and braking subject to the antilocking ABS control position, connect the outlet pressure space of the brake unit with the ASR outlet pressure space of the hydraulic cylinder and also connect the ABS control space of the hydraulic cylinder with the brake circuit of the vehicle wheels;

the two function control valves movable to their excited propulsion ASR control mode position by the outlet pressure of the auxiliary pressure source, wherein the ASR outlet pressure space is connected to the brake circuit and the the ABS control space of the hydraulic cylinder is connected to a brake fluid storage tank;

an electrically activatable function control valve movable by the control system into its excited propulsion control position, in which a control pressure is fed into the control spaces of the two hydraulically activatable valves to move them from their basic position to their excited positions, a relief flow path means for relieving the control pressure spaces of the two hydraulically controlled valves which is either open in the basic position of these two valves, or which can be opened at least temporarily by a further control valve.

15. Control system according to claim 6, wherein:

there is a 2/2-way solenoid control valve which is moved out of its basic propulsion ASR control position by the control system, in which the outlet pressure space of the brake unit is connected to the ASR outlet pressure space of the hydraulic cylinder, into its excited position where it blocks that connection;

two hydraulically activatable control valves, set to be in basic normal braking and braking subjected to the antilocking ABS control positions when they are connected to a Pressureless hydraulic actuation source and to their excited position when connected to a pressure hydraulic source for ASR propulsion control mode;

one of the two hydraulically controlled valves being designed as a 3/2-way valve which, in its basic position connects the ABS control space of the hydraulic cylinder to the brake circuit and in its excited position connects the ABS control space to a pressureless brake fluid storage tank;

the other of the two hydraulically controllable valves being designed as a 2/2-way valve which, in its basic position blocks the connection of the ASR outlet pressure space of the hydraulic cylinder from the brake circuit and in its excited position connects the ASR outlet pressure space to the brake circuit;

said pedal operating on a brake piston to produce a brake pressure in said outlet space;

a displacement controlled 2/2-way valve which, after a small fraction of the brake pressure build-up stroke of the brake piston reducing the outlet pressure space of the brake unit, moves out of its basic position, connecting the two hydraulic controlled valves to the pressure actuation source at said drive pressure space of the hydraulic cylinder, into an excited position in which the hydraulic valves are disconnected to the drive pressure space and are connected to said pressureless source;

a one-way valve inserted between a common control connection of the two hydraulically activatable valves and the drive pressure space of the hydraulic cylinder which is open as a result of a relatively higher actuation pressure for the two hydraulic valves than the pressure in the drive pressure space of the hydraulic cylinder to relieve the actuation pressure if it becomes too large.

16. Control system according to claim 6, wherein said pedal operates a brake piston to produce a brake pressure in said outlet pressure space;

said function control valve means comprises three mechanically displaceably controlled valves which, after a small fraction of a brake pressure build-up stroke of the brake piston reducing the outlet pressure space of the brake unit, move from their basic non-actuated state of the brake system or propulsion ASR control mode positions into an excited normal braking or braking subjected to the antilocking ABS control positions;

and wherein the particular control mode is selected by connecting the drive pressure space of the hydraulic cylinder to the high pressure outlet of the auxiliary pressure source.

17. Control system according to claim 16, wherein a first of the mechanically displaceable valves is a 2/2-way valve which, in its basic position, blocks a flow from an inlet line to an outlet line for connecting the outlet pressure space of the brake unit with the main brake line of the brake circuit and with the ASR outlet pressure space of the hydraulic cylinder;

said first mechanically displaceable valve being moved to its active position when the brake system is actuated to open the connection between the pressure space and both the main brake line and the ASR outlet pressure space;

a second of said mechanically displaceable controlled valve being a 2/2-way valve which, in its basic position, connects outlet line leading from the first mechanically displaceable valve to the main brake line branching off to the wheel brakes, and in its excited position closing off the outlet line to the main brake line;

the third of said mechanically displaceable controlled valve being a 3/2-way valve which in its basic position connects the ABS control space of the hydraulic cylinder to a brake fluid storage tank and in its excited brake system actuated position connects the ABS control space to the main brake line of the brake circuit.

18. Control system according to claim 6, wherein there are mechanically displaceable controlled valve means in a basic non-actuated state of the brake system position, connect the ASR outlet pressure space of the hydraulic cylinder to the main brake line of the controllable brake circuit and disconnect the ABS control space from the main brake line and connect it to a brake fluid storage tank of the brake system;

the mechanically displaceable controlled valve means is movable to an excited position to connect the ABS control space to the main brake line and closes off the connection to the brake fluid storage tank as well as the connection between the ASR outlet pressure space and the ABS control space;

an electrically activatable function control valve, actuated by a control signal in response to the activation of the propulsion ASR control to move from a basic position, in which the outlet pressure space of the brake unit is connected to the ASR outlet pressure space of the hydraulic cylinder to an excited blocking position closing this connection.

19. Control system according to claim 18, wherein the mechanically displaceable controlled valve means comprises three change over valves which are 2/2-way valves;

the first of these three change over valves connecting the ASR outlet pressure space of the hydraulic cylinder to the main brake line of the static brake circuit, when in its basic position;

a second of these three change over valves in its basic position, blocks a connection of the ABS control space to the main brake line; and the third of these three change over valves when in its basic position, connects the ABS control space to a brake fluid storage tank.

20. Control system according to claim 18, wherein the mechanically displaceable controlled valve means comprises a 2/2-way valve moveable between a through flow basic position for connecting the ASR outlet pressure space of the hydraulic cylinder to the main brake line of the static brake circuit to an excited position blocking that connection;

a 3/2-way movable from a basic position connecting the ABS control space to the brake fluid storage tank into an excited position when the brake unit is actuated to close the connection of the ABS control space to the storage tank and instead connects the ABS control space to the main brake line of the static brake circuit.

21. Control system according to claim 1, wherein the function control valve means comprise displacement controlled valve means which, in a basic non-actuated state of the brake system position, connect the ABS control space of the hydraulic cylinder to a pressure relief means and closes off an initial line leading from the outlet pressure space of the brake unit to the main brake line of the static brake circuit via a further line which also connects with the ASR outlet pressure space of the hydraulic cylinder and in its excited brake actuated position connects the ABS control space of the hydraulic cylinder to the main brake line of the brake circuit while also connecting the outlet pressure space of the brake unit to the ASR outlet pressure space of the hydraulic cylinder through said initial and further lines;

a first activatable function control valve actuated by the control means during normal braking to its basic position connecting the outlet pressure space of the brake unit to the main brake line and which is moved by the control means into its excited position for the duration of both an antilocking ABS cycle and a propulsion ASR control cycle wherein the connection between the outlet pressure space and the main brake line is closed;

a second activatable function control valve actuated by the control means into its basic position, which blocks a flow path leading from the ASR outlet pressure space of the hydraulic cylinder to the main brake line and which, by an output signal linked to the activation of the propulsion ASR control, is moved into its excited position in which the ASR outlet pressure space is connected to the main brake line of the static brake circuit.

22. Control system according to claim 21, wherein the first activatable function control valve is designed as a hydraulically activatable 2/2-way valve which is activated into its blocking position by the outlet pressure of the auxiliary pressure source via a drive/control valve means which makes a connection between the drive pressure space of the hydraulic cylinder and the auxiliary pressure source with the hydraulically activatable valve.

23. Control system according to claim 1, wherein the function control valve manss comprises a displacement controlled valve means arrangement which, in the basic non-actuated state of the brake system position, connects the ABS control space of the hydraulic cylinder to a pressureless source while also blocking an initial line connecting the outlet pressure space to the brake unit of the main brake line of the static brake circuit through an outlet line and a further valve element of the mechanically actuable valve means;

the ASR outlet pressure space of the hydraulic cylinder is likewise connected via this further valve element to the main brake line;

said pedal operating a brake piston to produce a brake pressure in said outlet pressure space when the brake system is actuated;

after a small fraction of the pressure build-up stroke of the brake piston reducing the outlet pressure space of the brake unit, the brake piston moves the displacement control valve means to its excited position to connect the ABS control space to the main brake line branching off to the wheel brakes of the main brake circuit as well as to shut off the inlet line of the main brake line starting from the outlet pressure space of the brake unit from the outlet line and to shut off the connection of the ASR outlet pressure space of the hydraulic cylinder from the main brake line.

24. Control system according to claim 23, wherein there is a change over valve which, in its basic through flow position connects the ASR outlet pressure space of the hydraulic cylinder to its ABS control space and which change over valve is moved into its excited blocking position disconnecting the ASR outlet pressure space from ABS control space by the control when and for as long as the antilocking ABS or propulsion ASR control is activated.

25. Control system according to claim 24, wherein the change over valve is designed as at least one of a 2/2-way solenoid valve which is moved into its blocking position by an electrical signal appearing for the duration of activation of the control system, or as a hydraulically controlled valve which is moved into its blocking position when and as long as the auxiliary pressure source is coupled to an activation drive pressure space of the valve via the drive/control valve means.

26. Control system according to claim 23, wherein there is a change over valve which, in its basic through flow position connects the outlet pressure space of the brake unit to the main brake line of the static brake circuit and is moved into its excited position, for blocking this connection by the control system when and for as long as the control system is activated.

27. Control system according to claim 1, wherein said pedal operates a brake piston to produce a brake pressure in said outlet pressure space;
- a position indicator which monitors the position of the brake piston which defines the static outlet pressure space;
- said position indicator generating an output signal causing the auxiliary pressure source to be disconnected from the drive pressure space of the hydraulic cylinder, when, during the course of an antilocking ABS control phase, the piston of the brake unit reaches its basic position or a position immediately adjacent to this.

28. Control system according to claim 1, wherein the drive control valve arrangement comprises two 2/2-way solenoid control valves, one of which in its basic position shuts off the pressure outlet of the auxiliary pressure source from the drive pressure space of the hydraulic cylinder and in its excited position connects this pressure outlet to the auxiliary pressure source;
- said other valve, in its basic position connects the drive pressure of the hydraulic cylinder to a pressureless tank of the auxiliary pressure source and in its excited position closes off this Connection to the pressureless tank;
- both of these two control valves actuated by a signal from the control system.

* * * * *